US011463890B2

(12) United States Patent
Fujiwaka

(10) Patent No.: US 11,463,890 B2
(45) Date of Patent: Oct. 4, 2022

(54) LOCATION CHANGE MANAGING DEVICE, LOCATION CHANGE MANAGING METHOD, AND RECORDING MEDIUM IN WHICH LOCATION CHANGE MANAGING PROGRAM IS STORED

(71) Applicant: NEC Corporation, Tokyo (JP)

(72) Inventor: Masaya Fujiwaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 107 days.

(21) Appl. No.: 17/252,913

(22) PCT Filed: Jun. 19, 2019

(86) PCT No.: PCT/JP2019/024277
§ 371 (c)(1),
(2) Date: Dec. 16, 2020

(87) PCT Pub. No.: WO2020/004171
PCT Pub. Date: Jan. 2, 2020

(65) Prior Publication Data
US 2021/0266758 A1      Aug. 26, 2021

(30) Foreign Application Priority Data

Jun. 27, 2018   (JP) .............................. JP2018-122214

(51) Int. Cl.
*H04W 4/02*       (2018.01)
*H04W 4/029*      (2018.01)
(Continued)

(52) U.S. Cl.
CPC ........... *H04W 16/18* (2013.01); *H04W 4/029* (2018.02); *H04W 24/02* (2013.01);
(Continued)

(58) Field of Classification Search
CPC ....... H04W 24/02; H04W 3/00; H04W 11/00; H04W 16/18; H04W 24/08
(Continued)

(56) References Cited

U.S. PATENT DOCUMENTS

2011/0003596 A1    1/2011   Motoyoshi
2011/0019576 A1*   1/2011   Kobayashi ............ H04W 16/18
                                                        370/252

FOREIGN PATENT DOCUMENTS

JP      2005-160046 A     6/2005
JP      2010-273346 A    12/2010
(Continued)

OTHER PUBLICATIONS

International Search Report for PCT Application No. PCT/JP2019/024277, dated Aug. 27, 2019.
(Continued)

*Primary Examiner* — Inder P Mehra
(74) *Attorney, Agent, or Firm* — Sughrue Mion, PLLC

(57) ABSTRACT

A location change managing device includes: a generation unit that, when a communication environment by wireless communication apparatuses changes from a first state to a second state, generates location candidates for the wireless communication apparatuses in the second state so as to be different from locations of the wireless communication apparatuses in the first state; an estimation unit that estimates communication quality pertaining to the location candidates by the wireless communication apparatuses in the first state; a calculation unit that calculates, with respect to the location candidates, a location change cost required for changing the locations of the wireless communication apparatuses from the locations in the first state to the location candidates; and a selection unit for selecting a specific location candidate, from among the location candidates, that satisfies criteria, the selection being made based on the
(Continued)

communication quality pertaining to the location candidates and the location change cost.

20 Claims, 14 Drawing Sheets

(51) Int. Cl.
*H04W 16/18* (2009.01)
*H04W 24/02* (2009.01)
*H04W 64/00* (2009.01)
*H04W 72/04* (2009.01)
*H04W 72/08* (2009.01)

(52) U.S. Cl.
CPC ....... *H04W 64/006* (2013.01); *H04W 72/042* (2013.01); *H04W 72/048* (2013.01); *H04W 72/085* (2013.01)

(58) Field of Classification Search
USPC .......................................................... 370/329
See application file for complete search history.

(56) References Cited

FOREIGN PATENT DOCUMENTS

| | | |
|---|---|---|
| JP | 5872713 B2 | 3/2016 |
| JP | 2016-163353 A | 9/2016 |
| WO | 2009/119545 A1 | 10/2009 |
| WO | 2009/119786 A1 | 10/2009 |
| WO | 2014/102999 A1 | 7/2014 |

OTHER PUBLICATIONS

English translation of Written opinion for PCT Application No. PCT/JP2019/024277, dated Aug. 27, 2019.

* cited by examiner

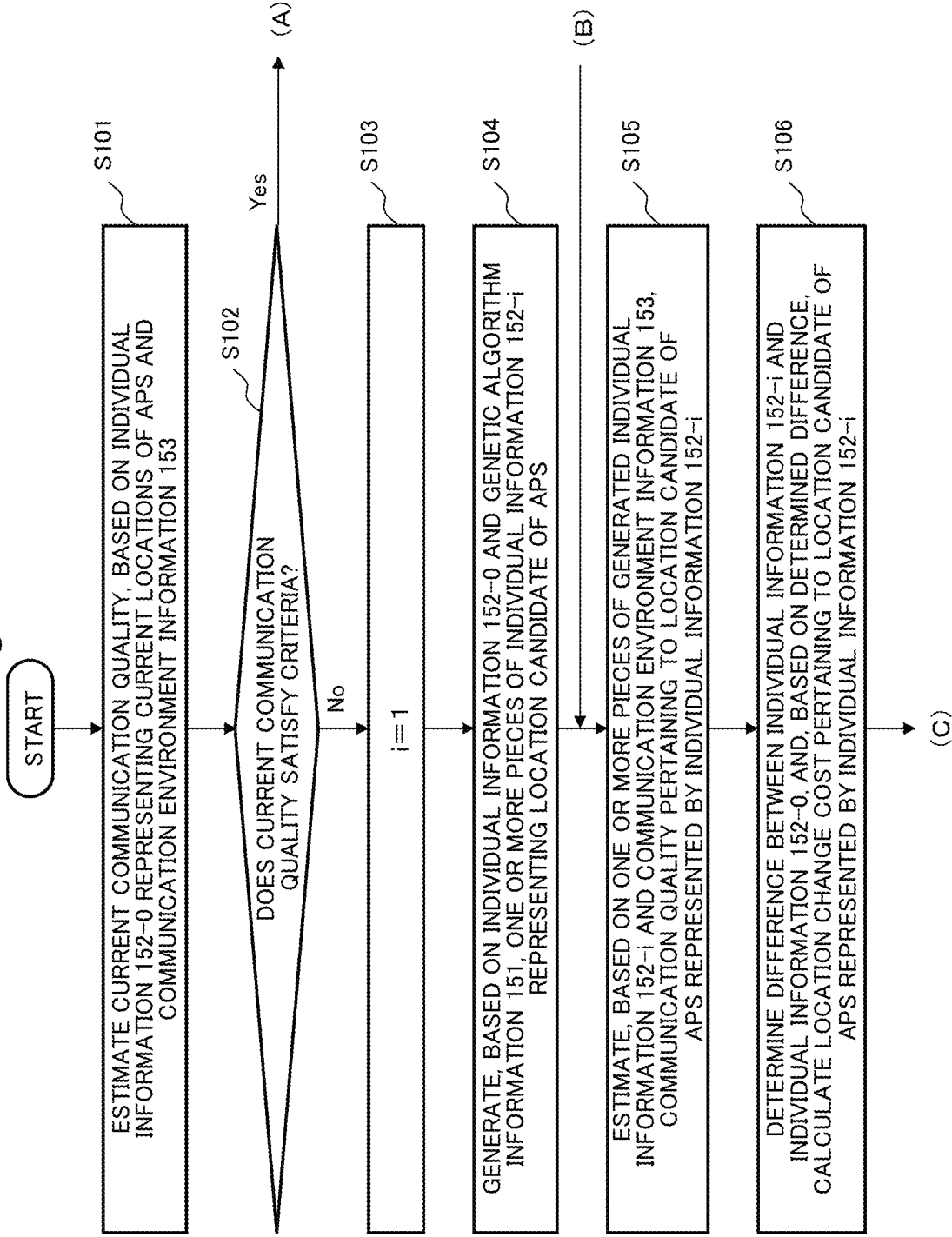

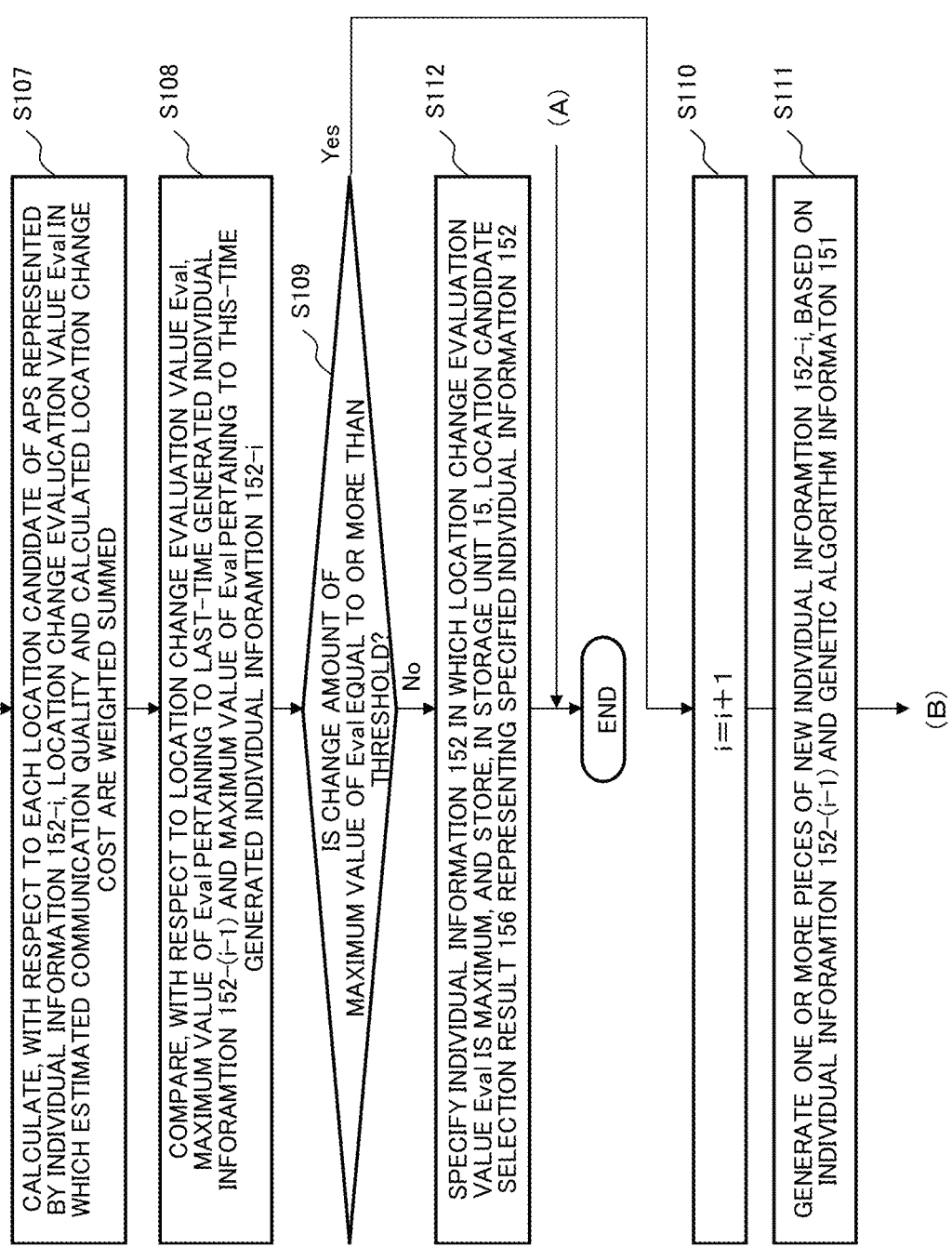

LOCATION CHANGE MANAGING DEVICE, LOCATION CHANGE MANAGING METHOD, AND RECORDING MEDIUM IN WHICH LOCATION CHANGE MANAGING PROGRAM IS STORED

This application is a National Stage Entry of PCT/JP2019/024277 filed on Jun. 19, 2019, which claims priority from Japanese Patent Application 2018-122214 filed on Jun. 27, 2018, the contents of all of which are incorporated herein by reference, in their entirety.

TECHNICAL FIELD

The present invention relates to a technique for managing location changes of wireless communication apparatuses according to a change of a communication environment in a location where the communication environment of the wireless communication apparatuses changes.

BACKGROUND ART

Recently, in a construction site, a factory, or the like, for a purpose of productivity improvement or safety improvement, introduction of an information and communication technology (ICT) system using a wireless network has been promoted. For example, in a construction site, a construction machine is remotely controlled via a wireless network and thereby work in a dangerous site can be safely performed. Alternatively, based on location information of a worker being acquired via a wireless network, a waiting time, an inefficient behavior, or the like in work is analyzed, and thereby productivity efficiency can be improved.

In this manner, when an ICT system is introduced, in many cases, it is necessary to construct a wireless communication environment. However, in a construction site or the like, a physical environment changes as work progresses, and due to this, a wireless communication environment (an environment where radio waves propagate) largely changes, and therefore communication quality of wireless communication may largely decrease. Therefore, in a location where such an environment change pertaining to wireless communication is severe, an expectation toward a technique for achieving construction of a stable wireless communication environment is growing.

As a technique related to such a technique, PTL 1 discloses a wireless network system that receives geological information of a work site and access point (AP) information including installation cost information and relocation cost information of an access point to be used, and generates a time-series location plan of an access point. This system further receives time-series excavation schedule information based on a plan and time-series communication area information. This system displays, for one or more access points, at least one of installation information, relocation information, and removal information in a time-series manner.

PTL 2 discloses a system that determines, in order to achieve performance of a network at a desired level, configuration setting optimum or preferable for wireless or wired network apparatuses. This system displays, on a display, a physical environment where a communication system is deployed. This system includes a plurality of wireless communication components located in a plurality of different locations in a physical environment and displays, on a display, a graphical icon in such a way that a location or existence of a wireless communication component can be identified. This system includes a data processor that retrieves, stores, or processes information describing each of a plurality of wireless communication components associated with a display and identifies a previously-defined communication method for at least some of these wireless communication components. This system selectively displays, on a display, when at least one graphical icon related to at least one of a plurality of wireless communication components is selectively specified on a display, at least either of graphics information and text information via a data processor related to at least one of the wireless communication components.

PTL 3 discloses an operation environment setting system in which, when an access destination of a mobile communication terminal is changed, required operation environment setting is simply performed. A mobile communication terminal mounted on a construction machine in this system includes a satellite communication terminal and a wireless local area network (LAN) terminal. In this system, when the construction machine is located in a new construction site, the mobile communication terminal transmits an operation environment setting request and location information to a management server from the satellite communication terminal. The management server selects, in response to the request, based on the received location information, operation environment setting data of a wireless LAN of the construction site and transmits the selected setting data to the satellite communication terminal of the mobile communication terminal. The mobile communication terminal automatically sets, based on the received setting data, an operation environment of the wireless LAN terminal.

CITATION LIST

Patent Literature

[PTL 1] Japanese Registered Patent Publication No. 5872713
[PTL 2] Japanese Unexamined Patent Application Publication No. 2010-273346
[PTL 3] Japanese Unexamined Patent Application Publication No. 2005-160046

SUMMARY OF INVENTION

Technical Problem

In a location where an environment change pertaining to wireless communication is severe as described above, it is necessary to maintain communication quality at a predetermined level or higher by changing locations of wireless communication apparatuses to be installed in the location according to a change of a physical environment. At that time, a challenge is to construct a stable wireless communication environment more reliably and efficiently. PTLs 1 to 3 do not specifically refer to this challenge. A main object of the present invention is to provide a location change managing device and the like that resolve this challenge.

Solution to Problem

A location change managing device according to one aspect of the present invention includes: a generation means that generates, when a communication environment of wireless communication apparatuses changes from a first state to a second state, one or more location candidates for the wireless communication apparatuses in the second state in such a way as to be different from locations of the wireless communication apparatuses in the first state; an estimation means that estimates communication quality pertaining to the location candidates for the wireless communication apparatuses in the second state; a calculation means that calculates, with respect to the location candidates, a location change cost required for changing locations of the wireless communication apparatuses from the locations in the first state to the location candidate; and a selection means that selects, based on the communication quality and the location change cost pertaining to the location candidates, a specific location candidate that satisfies criteria from among the location candidates.

According to another aspect achieving the object, a location change managing method according to one aspect of the present invention includes, by an information processing device: generating, when a communication environment of wireless communication apparatuses changes from a first state to a second state, one or more location candidates for the wireless communication apparatuses in the second state in such a way as to be different from locations of the wireless communication apparatuses in the first state; estimating communication quality pertaining to the location candidates for the wireless communication apparatuses in the second state; calculating, with respect to the location candidates, a location change cost required for changing locations of the wireless communication apparatuses from the locations in the first state to the location candidate; and selecting, based on the communication quality and the location change cost pertaining to the location candidates, a specific location candidate that satisfies criteria from among the location candidates.

According to still another aspect achieving the object, a location change managing program according to one aspect of the present invention causes a computer to execute: generation processing of generating, when a communication environment of wireless communication apparatuses changes from a first state to a second state, one or more location candidates for the wireless communication apparatuses in the second state in such a way as to be different from locations of the wireless communication apparatuses in the first state; estimation processing of estimating communication quality pertaining to the location candidates for the wireless communication apparatuses in the second state; calculation processing of calculating, with respect to the location candidates, a location change cost required for changing the locations of the wireless communication apparatuses from the locations in the first state to the location candidate; and selection processing of selecting, based on the communication quality and the location change cost pertaining to the location candidates, a specific location candidate that satisfies criteria from among the location candidates.

The present invention can be also achieved by a computer-readable, non-volatile recording medium storing the location change managing program (computer program).

Advantageous Effects of Invention

The present invention is able to reliably and efficiently construct a wireless communication environment with stable quality, even in a location where an environment change pertaining to wireless communication is severe.

BRIEF DESCRIPTION OF DRAWINGS

FIG. 3 is a diagram exemplarily illustrating current locations of access points in the work site according to the first example embodiment of the present invention and communication quality based on the locations estimated by the location change managing device 10.

FIG. 11A is a flowchart (1/2) illustrating an operation of the location change managing device 10 according to the first example embodiment of the present invention.

FIG. 11B is a flowchart (2/2) illustrating an operation of the location change managing device 10 according to the first example embodiment of the present invention.

EXAMPLE EMBODIMENT

Hereinafter, example embodiments of the present invention are described in detail with reference to the drawings.

First Example Embodiment

Figure 1:
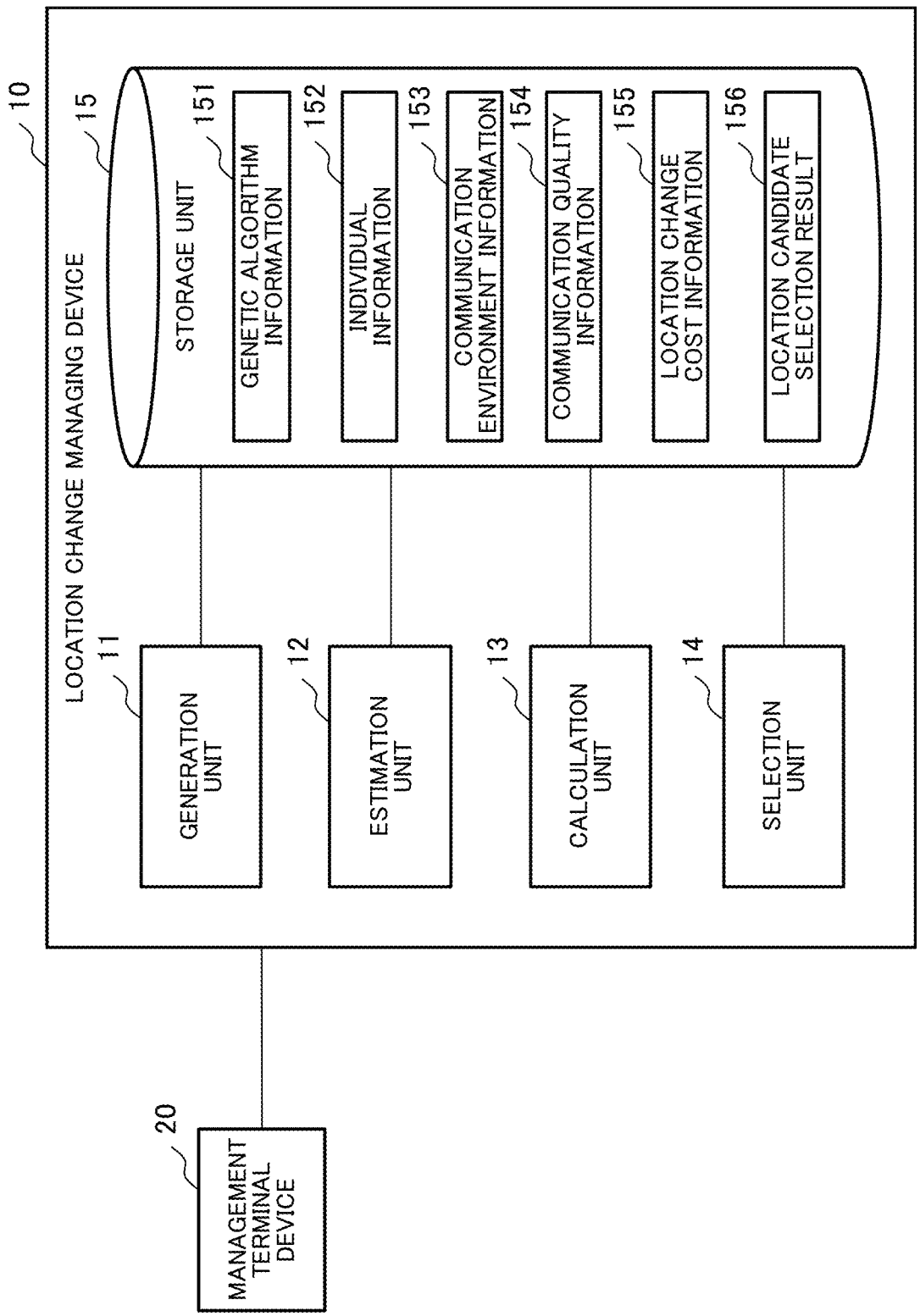
FIG. 1 is a block diagram illustrating a configuration of a location change managing device 10 according to a first example embodiment of the present invention.

FIG. 1 is a block diagram illustrating a configuration of a location change managing device 10 according to a first example embodiment of the present invention. The location change managing device 10 is an information processing device that manages, in a work site such as a construction site, a factory, or the like being a location where a communication environment of wireless communication of access points (which may be hereinafter referred to as "APs" in the present invention) changes due to a change of a physical environment, a location change (relocation) of the access point according to a change of the communication environment.

The location change managing device 10 is communicably connected to a management terminal device 20. The management terminal device 20 is a terminal device such as a personal computer and the like used when a user inputs information to the location change managing device 10 or a user confirms information output from the location change managing device 10.

The location change managing device 10 includes a generation unit 11, an estimation unit 12, a calculation unit 13, a selection unit 14, and a storage unit 15. The storage unit 15 is, for example, a storage device such as an electronic memory, a magnetic disk, and the like. The storage unit 15 stores genetic algorithm information 151, individual information 152, communication environment information 153, communication quality information 154, location change cost information 155, and a location candidate selection result 156. Details of these pieces of information stored in the storage unit 15 are described later.

Figure 2:
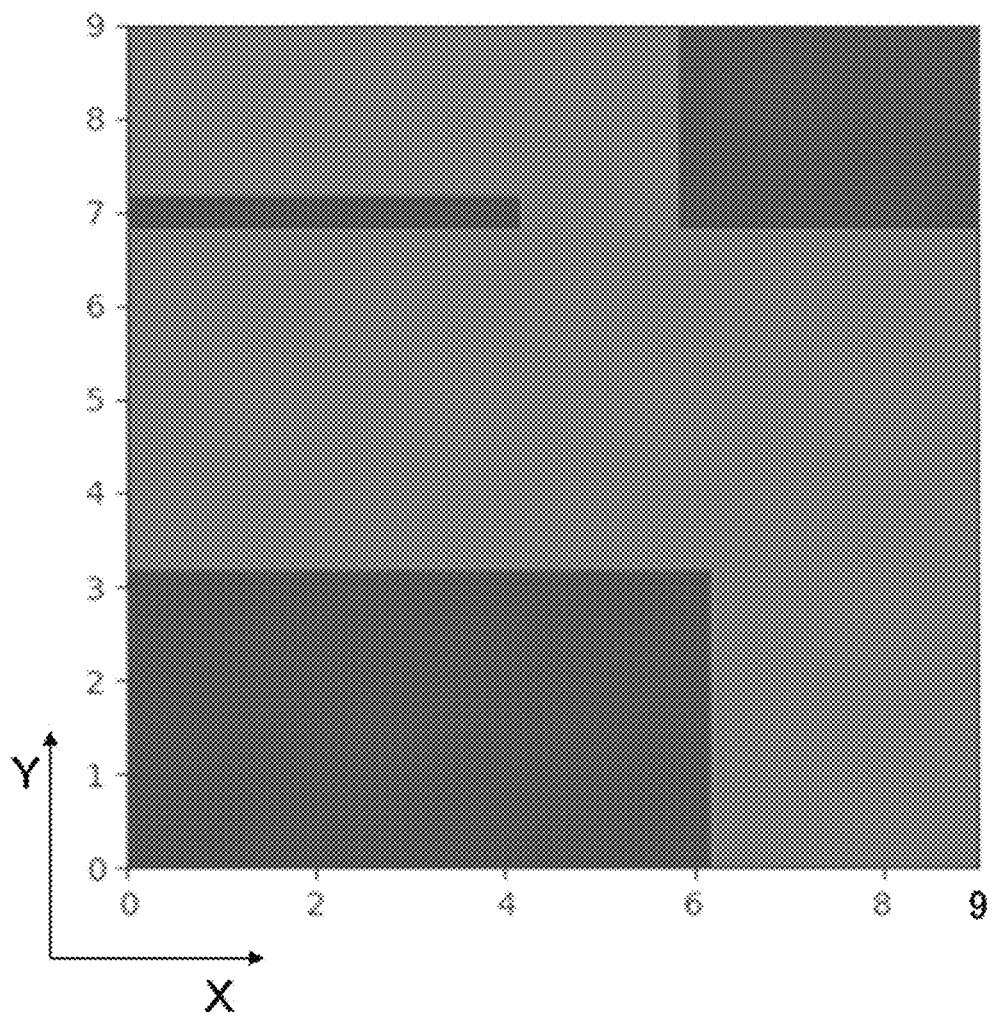
FIG. 2 is a diagram exemplarily illustrating a current situation pertaining to a region where communication of a wireless communication apparatuses is required in a work site where the location change managing device 10 according to the first example embodiment of the present invention manages a location change of an access point.

FIG. 2 is a diagram exemplarily illustrating a current situation pertaining to a region where communication of wireless communication apparatuses such as mobile terminals and the like is required in a work site where the location change managing device 10 according to the present example embodiment manages a location change of APs. The location change managing device 10 manages, when a work site to be managed is represented by XY two-dimensional coordinates as exemplarily illustrated in FIG. 2, locations of APs installed in at least any one of a total of 100 points whose XY coordinates are (0,0) to (9,9).

In FIG. 2, it is assumed that regions represented by a dark color, i.e. a rectangular region where vertexes are XY coordinates (0,0), (0,3), (6,0), and (6,3) and a rectangular region where vertexes are XY coordinates (6,7), (6,9), (9,7), and (9,9) represent a region in which wireless communication of wireless communication apparatuses via APs is not needed in work in the work site. In FIG. 2, it is assumed that a region represented by a dark color connecting XY coordinates (0,7) and (4,7) represents a wall in a work site. However, it is assumed that this wall has a height in a vertical direction with respect to an XY plane (paper plane) exemplarily illustrated in FIG. 2.

In FIG. 2, a region represented by a pale color except the above-described regions represented by a dark color represents a region where wireless communication of wireless communication apparatuses via APs is required in work in a work site. In other words, the location change managing device 10 according to the present example embodiment manages locations of APs in order to locate, in a region illustrated in FIG. 2 where wireless communication of wireless communication apparatuses via APs is required, APs in such a way that communication quality of wireless communication satisfies criteria.

Figure 3:
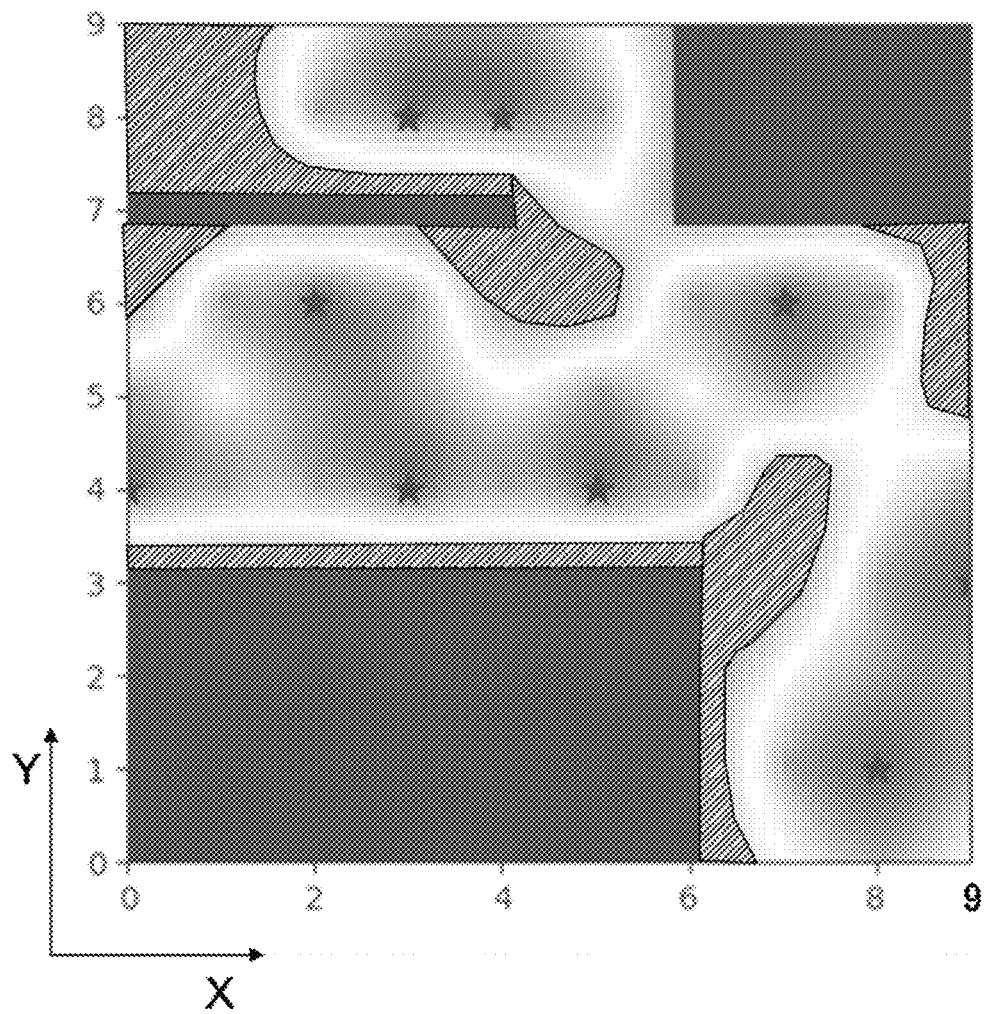
[FIG. 3]

FIG. 3 is a diagram exemplarily illustrating current locations of APs in a work site where the location change managing device 10 according to the present example embodiment manages a location change of APs, and communication quality, estimated by the location change managing device 10, of wireless communication based on the location. A star mark in FIG. 3 represents a location where an AP is currently located.

A portion that is represented by a dark color and is not shaded by a diagonal line in a region in FIG. 3 where wireless communication of wireless communication apparatuses via APs is required represents locations where communication quality of wireless communication estimated by the location change managing device 10 is excellent (satisfies criteria). In contrast, a portion shaded by a diagonal line in the region in FIG. 3 where wireless communication of wireless communication apparatuses via APs is required represents locations where communication quality of wireless communication estimated by the location change managing device 10 is poor (does not satisfy criteria). An operation of estimating communication quality of wireless communication, based on the location change managing device 10, is described later.

As exemplarily illustrated in FIG. 3, a situation that a location where communication quality of wireless communication is poor currently exists over a wide range results from a fact that a physical environment changes with progress of work in a work site until now from a time at which APs were located as exemplarily illustrated in FIG. 3 and therefore a communication environment of APs changes.

Figure 4:
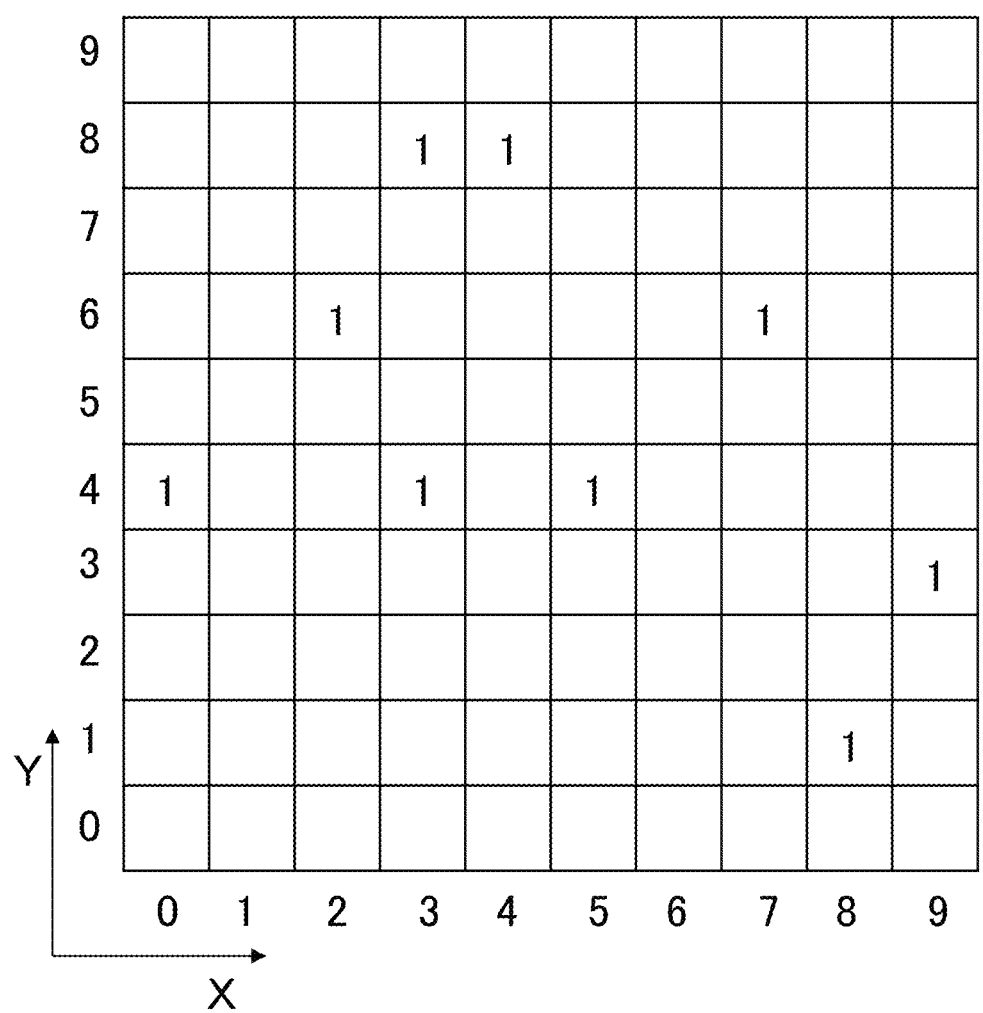
FIG. 4 is a diagram exemplarily illustrating individual information 152-0 representing the current locations of the access points exemplarily illustrated in FIG. 3.

FIG. 4 is a diagram exemplarily illustrating individual information 152-0 (location information) representing current locations of APs exemplarily illustrated in FIG. 3. Individual information 152 stored in the storage unit 15 includes information representing current locations of APs and in addition, information, generated by the generation unit 11 to be described later, representing a location candidate (location idea) to which locations of APs are changed, and in the present invention, information representing current locations of APs is referred to as individual information 152-0 as described above.

Individual information 152-0 exemplarily illustrated in FIG. 4 is information in which values pertaining to XY coordinates (i.e. a locations where APs are located) indicated by star marks in FIG. 3 are designated as "1" and values pertaining to XY coordinates (i.e. a location where APs are not located) other than the former XY coordinates are designated as "0". However, in the present invention, for convenience of description, it is assumed that illustration is made by omitting "0" in FIG. 4 (the case is the same as in FIG. 5 to FIG. 7 to be described later).

Individual information 152-0 may be information input by a user via the management terminal device 20 or may be information generated by the generation unit 11 to be described later, based on information input by a user via the management terminal device 20.

The generation unit 11 illustrated in FIG. 1 generates, when a communication environment of APs changes from a first state (e.g. a state where the AP was located in a current location) to a second state (e.g. a current state), one or more location candidates for the APs in the second state in such a way as to be different from locations of the APs in the first state. The generation unit 11 according to the present example embodiment generates a location candidate for APs in a second state, based on the genetic algorithm information 151. However, it is assumed that the genetic algorithm information 151 is stored in the storage unit 15 by, for example, an input operation for the management terminal device 20 by a user.

A genetic algorithm represented by the genetic algorithm information 151 is a procedure for generating a crossover or mutation with respect to an element of a gene included in certain individual information and thereby generating next-generation individual information. According to the present example embodiment, individual information is, as described above, equivalent to information representing locations of APs, and an element of a gene included in the individual information is equivalent to an individual location (e.g. 100 XY coordinates exemplarily illustrated in FIG. 4) where the AP can be located. According to the present example embodiment, a crossover in a genetic algorithm is equivalent to relocation of an AP located in a certain location to another location. According to the present example embodiment, a mutation in a genetic algorithm is equivalent to removal of an AP located in a certain location or new installation of an AP in a certain location.

Figure 5:
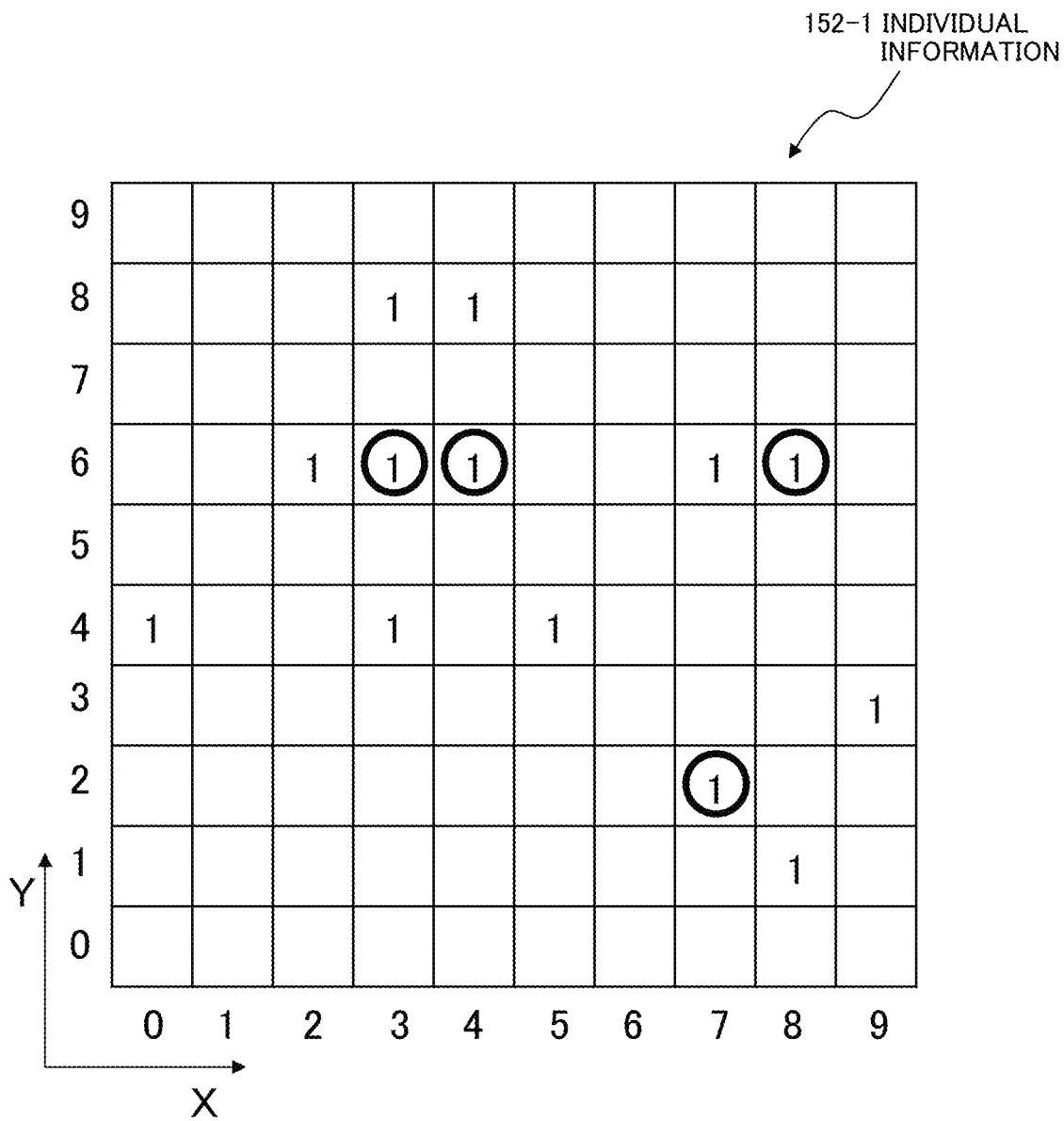
FIG. 5 is a diagram exemplarily illustrating individual information 152-1 generated, based on the individual information 152-0 exemplarily illustrated in FIG. 4, by a generation unit 11 according to the first example embodiment of the present invention.

FIG. 5 is a diagram exemplarily illustrating individual information 152-1 representing a location candidate of APs generated by the generation unit 11, based on the individual information 152-0 exemplarily illustrated in FIG. 4. In the example illustrated in FIG. 5, the generation unit 11 generates, for the individual information 152-0 exemplarily illustrated in FIG. 4, individual information 152-1 representing a location candidate (a location idea) after performing a location change of newly installing APs in four XY coordinates (3,6), (4,6), (7,2), and (8,6) indicated by circular marks. In other words, the generation unit 11 generates, in the individual information 152-0, mutations for the four XY coordinates where APs are not located, and thereby generates the individual information 152-1.

Figure 6:
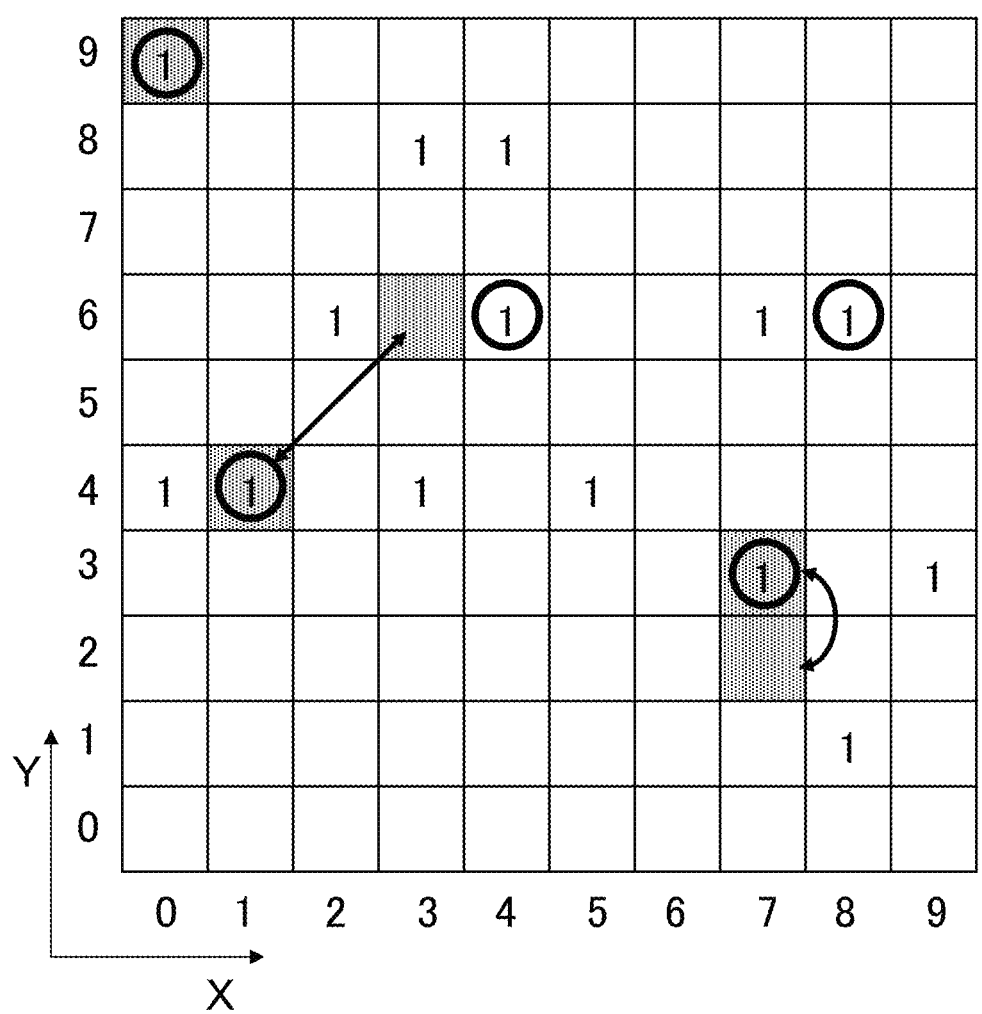
FIG. 6 is a diagram exemplarily illustrating individual information 152-2 generated, based on the individual information 152-1 exemplarily illustrated in FIG. 5, by the generation unit 11 according to the first example embodiment of the present invention.

FIG. 6 is a diagram exemplarily illustrating individual information 152-2 representing a location candidate of APs generated by the generation unit 11, based on the individual information 152-1 exemplarily illustrated in FIG. 5. In the example illustrated in FIG. 6, the generation unit 11 generates, for the individual information 152-1 exemplarily illustrated in FIG. 5, individual information 152-2 representing a location candidate after performing a location change in five XY coordinates (0,9), (1,4), (3,6), (7,2), and (7,3) indicated by a shaded portion. More specifically, the location change is that in the individual information 152-1, an AP located in XY coordinates (3,6) is relocated in XY coordinates (1,4), an AP located in XY coordinates (7,2) is relocated in XY coordinates (7,3), and an AP is newly installed in XY coordinates (0,9) where an AP is not located. In other words, the generation unit 11 generates, in the individual information 152-1, a crossover or mutation for the five XY coordinates and thereby generates the individual information 152-2. In the individual information 152-2 exemplarily illustrated in FIG. 6, five XY coordinates indicated by circular marks represent locations where locations of APs are changed between the individual information 152-0 and the individual information 152-2.

Figure 7:
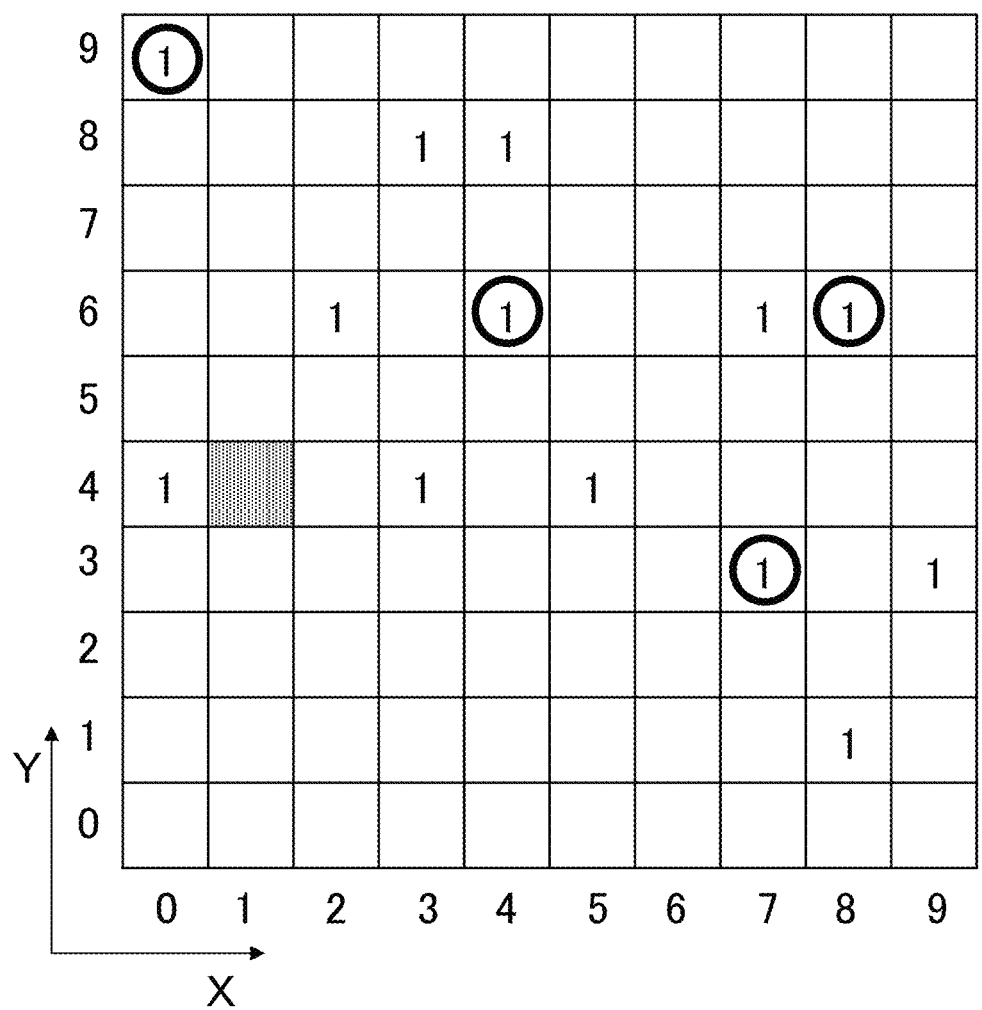
FIG. 7 is a diagram exemplarily illustrating individual information 152-3 generated, based on the individual information 152-2 exemplarily illustrated in FIG. 6, by the generation unit 11 according to the first example embodiment of the present invention.

FIG. 7 is a diagram exemplarily illustrating individual information 152-3 representing a location candidate of APs generated by the generation unit 11, based on the individual information 152-2 exemplarily illustrated in FIG. 6. In the example illustrated in FIG. 7, the generation unit 11 generates, for the individual information 152-2 exemplarily illustrated in FIG. 6, the individual information 152-3 representing a location candidate after performing a location change of removing an AP located in XY coordinates (1,4) indicated by a shaded portion. In other words, the generation unit 11 generates, in the individual information 152-2, a mutation for XY coordinate (1, 4) where the AP is located, and thereby generates the individual information 152-3. In the individual information 152-3 exemplarily illustrated in FIG. 7, four XY coordinates indicated by circular marks represent locations where locations of APs are changed between the individual information 152-0 and the individual information 152-3.

The generation unit 11 according to the present example embodiment executes, as described above, based on genetic algorithm information 151, an operation of generating, from individual information 152-$i$ of a certain generation i (i is any integer equal to or more than 0), individual information 152-$(i+1)$ of a subsequent generation over one or more generations. The generation unit 11 may further generate, from one piece of individual information 152-$i$, a plurality of pieces of individual information 152-$(i+1)$. The generation unit 11 stores the generated individual information 152 in the storage unit 15.

The estimation unit 12 illustrated in FIG. 1 estimates, based on individual information 152 generated by the generation unit 11 and communication environment information 153 representing a communication environment of the above-described second state (e.g. a current state), communication quality of APs with respect to each location candidate represented by the individual information 152. More specifically, the estimation unit 12 estimates, for example, a ratio of a region where communication quality satisfies criteria to a region where communication of APs is required in a work site. It is assumed that the communication environment information 153 is information representing a physical environment of a work site in the second state and is stored in the storage unit 15, for example, based on an input operation for the management terminal device 20 by a user.

The estimation unit 12 executes simulation pertaining to radio-wave propagation using, for example, a ray tracing method being an existing technique and thereby estimates communication quality of APs in an individual location of a work site. At that time, the estimation unit 12 may use measurement data pertaining to communication quality of APs in a work site, input based on an input operation for the management terminal device 20 by a user. Simulation pertaining to radio-wave propagation using a ray tracing method or the like is an existing technique, and therefore detailed description of the simulation is omitted in the present invention.

Figure 8:
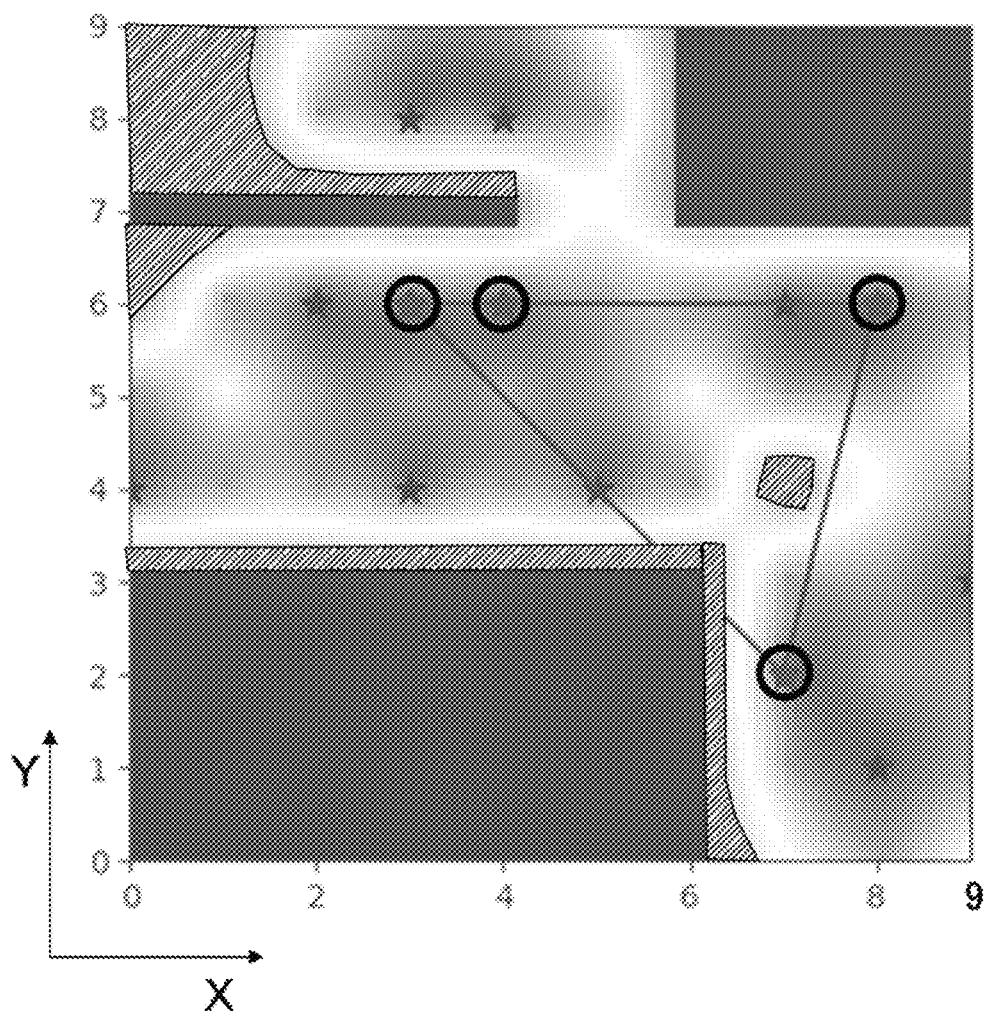
FIG. 8 is a diagram exemplarily illustrating communication quality estimated by an estimation unit 12 according to the first example embodiment of the present invention, when access points are located as indicated by the individual information 152-1 exemplarily illustrated in FIG. 5.

FIG. 8 is a diagram exemplarily illustrating communication quality estimated by the estimation unit 12 according to the present example embodiment, when an AP is located as indicated by the individual information 152-1 exemplarily illustrated in FIG. 5. A circular mark in FIG. 8 represents, as described above for FIG. 5, XY coordinates where a location change is performed from a current locations of APs as illustrated in FIG. 3 and FIG. 4.

When APs are located as indicated by the individual information 152-1 exemplarily illustrated in FIG. 5, a ratio of a region where communication quality of wireless communication is poor (does not satisfy criteria) in a work site decreases as illustrated in FIG. 3 and FIG. 8, compared with a case where APs are located as indicated by the individual information 152-0 exemplarily illustrated in FIG. 4. The reason is that in a location candidate for APs indicated by the individual information 152-1 exemplarily illustrated in FIG. 8, APs are newly installed in such a way as to reduce a region where communication quality of wireless communication illustrated in FIG. 3 is poor.

Figure 9:
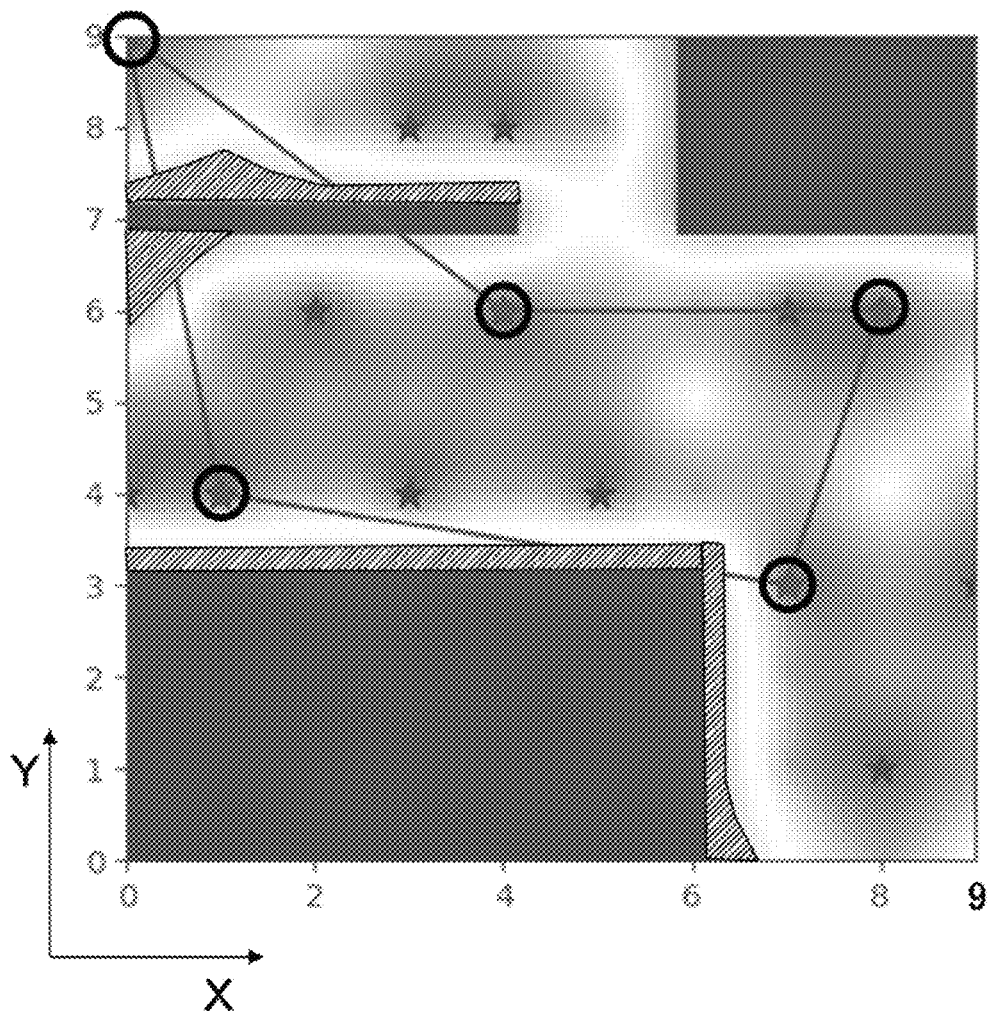
FIG. 9 is a diagram exemplarily illustrating communication quality estimated by the estimation unit 12 according to the first example embodiment of the present invention, when access points are located as indicated by the individual information 152-2 exemplarily illustrated in FIG. 6.

FIG. 9 is a diagram exemplarily illustrating communication quality estimated by the estimation unit 12 according to the present example embodiment, when APs are located as indicated by the individual information 152-2 exemplarily illustrated in FIG. 6. A circular mark in FIG. 9 represents, as described above for FIG. 6, XY coordinates where a location change is performed from current locations of APs as illustrated in FIG. 3 and FIG. 4.

When APs are located as indicated by the individual information 152-2 exemplarily illustrated in FIG. 6, a ratio occupied by a region where communication quality of wireless communication is poor in a work site further decreases as illustrated in FIG. 8 and FIG. 9, compared with a case where APs are located as indicated by the individual information 152-1 exemplarily illustrated in FIG. 5. The reason is that in location candidates for APs indicated by the individual information 152-2 exemplarily illustrated in FIG. 9, locations of APs are changed (newly installed or relocated) in such a way as to reduce a region (e.g. a vicinity of XY coordinates (0,9)) where communication quality of wireless communication illustrated in FIG. 8 is poor.

Figure 10:
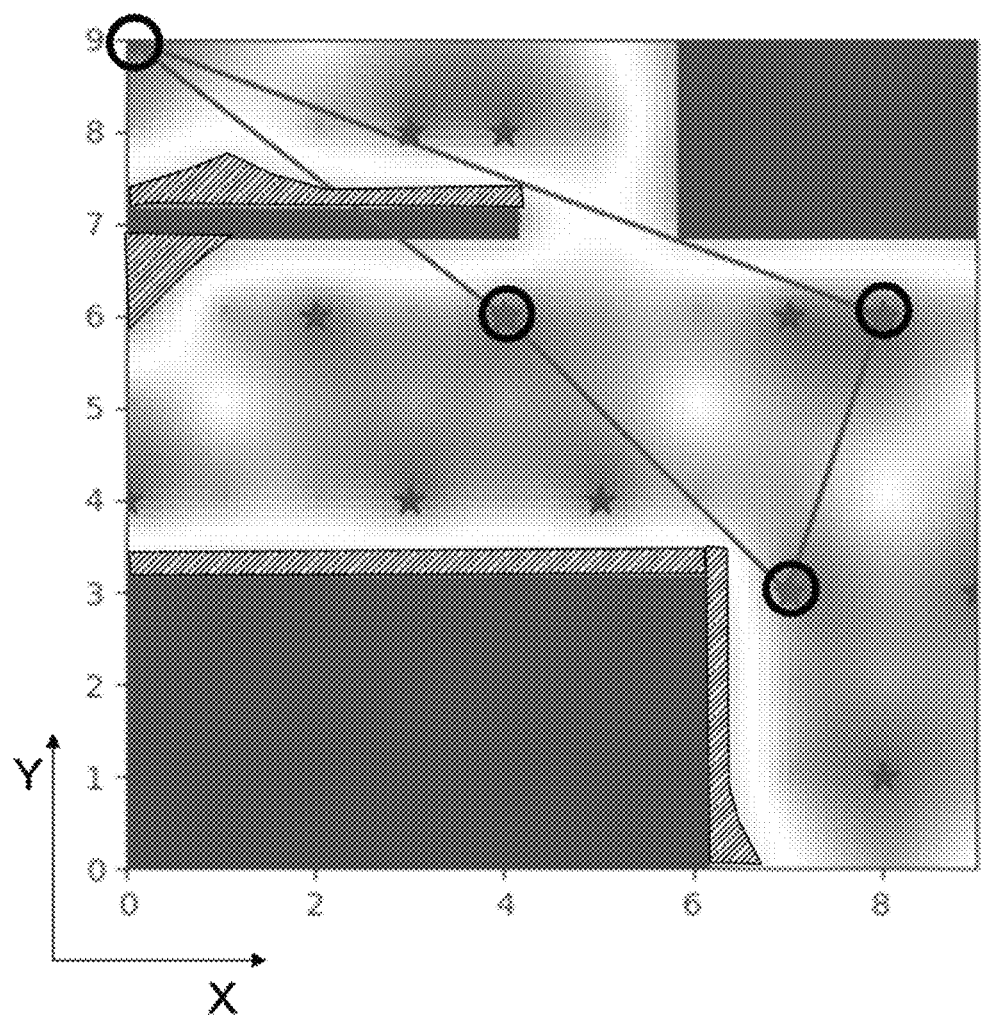
FIG. 10 is a diagram exemplarily illustrating communication quality estimated by the estimation unit 12 according to the first example embodiment of the present invention, when access points are located as indicated by the individual information 152-3 exemplarily illustrated in FIG. 7.

FIG. 10 is a diagram exemplarily illustrating communication quality estimated by the estimation unit 12 according to the present example embodiment in a case where APs are located as indicated by the individual information 152-3 exemplarily illustrated in FIG. 7. Circular marks in FIG. 10 represents, as described above for FIG. 7, XY coordinates where a location change is performed from current locations of APs illustrated in FIG. 3 and FIG. 4.

As described in FIG. 9 and FIG. 10, when APs are located as indicated by the individual information 152-3 exemplarily illustrated in FIG. 7, a ratio of a region where communication quality of wireless communication is poor in a work site is substantially equal, compared with a case where APs are located as indicated by the individual information 152-2 exemplarily illustrated in FIG. 6. A location candidate for APs indicated by the individual information 152-3 exemplarily illustrated in FIG. 7 has a small difference from the locations indicated by the individual information 152-0 exemplarily illustrated in FIG. 3, compared with a location candidate indicated by the individual information 152-2 exemplarily illustrated in FIG. 6. This indicates that removal of an AP located in XY coordinates (1, 4) being a difference between the individual information 152-2 and the individual information 152-3 has a small influence on communication quality of wireless communication in a work site.

The estimation unit 12 stores, with respect to each location candidate indicated by individual information 152-$i$, communication quality information 154 representing a result acquired by estimating communication quality of APs as described above in the storage unit 15.

The calculation unit 13 illustrated in FIG. 1 calculates, with respect to each location candidate, a location change cost required for changing locations of APs from current locations represented by individual information 152-0 to a location candidate represented by individual information 152-$i$ generated by the generation unit 11. A location cost calculated by the calculation unit 13 is an indicator depending on a cost (a cost based on a work time, a member cost, or the like) required for newly installing, removing, or relocating APs, a time required for moving installation locations of APs being a target for a location change by a worker (or a device that executes location change work), or the like.

A straight line connecting four circular marks exemplarily illustrated in FIG. 8 represents a path through which a worker or the like moves in a work site when locations of APs are changed from current locations represented by individual information 152-0 to a location candidate represented by individual information 152-1. Similarly, a straight line connecting five circular marks exemplarily illustrated in FIG. 9 represents a path through which a worker or the like moves in a work site when locations of APs are changed from current locations represented by individual information 152-0 to a location candidate represented by individual information 152-2. Similarly, a straight line connecting four circular marks exemplarily illustrated in FIG. 10 represents a path through which a worker or the like moves in a work site when locations of APs are changed from current locations represented by individual information 152-0 to a location candidate represented by individual information 152-3.

The calculation unit 13 calculates, in a process for calculating a location change cost, a shortest path through which a worker or the like moves installation locations of APs being a target for a location change. The calculation unit 13 may determine the shortest path, for example, by using a mathematical method and the like for a travelling salesman problem. In FIG. 8 to FIG. 10, for convenience of description, a straight line connecting circular marks is simply represented as a path through which a worker or the like moves, but actually, a worker or the like needs to move while avoiding an obstacle such as a wall and the like. Therefore, the calculation unit 13 refers to communication environment information 153 representing a physical environment of a work site and thereby more accurately calculates a path through which a worker or the like moves.

The calculation unit 13 stores, in the storage unit 15, location change cost information 155 representing a location change cost calculated for each location candidate as described above. It is assumed that the calculation unit 13 is previously provided with a procedure for determining, based on a calculated path through which a worker or the like moves, a time required for moving installation locations of APs, information pertaining to a cost required for newly installing, removing, or relocating APs, or the like.

The selection unit 14 illustrated in FIG. 1 selects, based on communication quality information 154 stored in the storage unit 15 by the estimation unit 12 and location change cost information 155 stored in the storage unit 15 by the calculation unit 13, a specific location candidate that satisfies criteria from among location candidates. The selection unit 14 according to the present example embodiment may employ, as the criteria, for example, criteria that a location cost evaluation value Eval($\alpha$) indicated by Expression 1 is maximum.

$$\text{Eval}(\alpha) = \text{Cover}(\alpha) - K_1 \times \text{Reloc}(\alpha_0, \alpha) \qquad \text{(Expression 1)}$$

Note that in Expression 1, "$\alpha$" represents a location candidate generated by the generation unit 11, and $\alpha_0$ represents current locations of APs represented by individual information 152-0. In Expression 1, Cover($\alpha$) represents communication quality (i.e. a value indicated by communication quality information 154) of a location candidate $\alpha$, and Reloc($\alpha_0, \alpha$) represents a location change cost (i.e. a value indicated by location change cost information 155) from the current location $\alpha_0$ of APs to the location candidate $\alpha$. In Expression 1, "$K_1$" is a parameter for adjusting weighting between communication quality and a location change cost in calculation of a location change evaluation value Eval($\alpha$) and is assumed to be provided, for example, by a user. In Expression 1, "−" and "×" are operators respectively representing subtraction and multiplication in this order.

An operation in which the selection unit 14 selects a specific location candidate from among location candidates (referred to as a location candidate $\alpha$1) represented by individual information 152-1 exemplarily illustrated in FIG. 5 and FIG. 8, a location candidate (referred to as a location candidate $\alpha$2) represented by individual information 152-2 exemplarily illustrated in FIG. 6 and FIG. 9, and a location candidate (referred to as a location candidate α3) represented by individual information 152-3 exemplarily illustrated in FIG. 7 and FIG. 10 is described.

With regard to a value of Cover(α) indicated by Expression 1, as exemplarily illustrated in FIGS. 8 to 10, the location candidates α2 and α3 are equal and the location candidate α1 can be regarded to be smaller than the location candidates α2 and α3. In this case, it is assumed that, based on an order of a magnitude of a value, values of Cover(α1), Cover(α2), and Cover(α3) are respectively regarded, for example, as "1", "2", and "3" in this order.

With regard to a value of Reloc($α_0$,α) indicated by Expression 1, as exemplarily illustrated in FIGS. 8 to 10, in order from a larger value, location candidates α2, α3, and α1 are regarded. In this case, it is assumed that based on an order of a magnitude of a value, values of Reloc($α_0$,α1), Reloc($α_0$,α2), and Reloc($α_0$,α3) are regarded, for example, as "1", "3", and "2" in this order.

In this case, the selection unit 14 calculates, for example, by setting of "$K_1$=1", values of Eval(α1), Eval(α2), and Eval(α3) as "0", "0", and "1" in this order, based on Expression 1. Therefore, the selection unit 14 selects, as a specific location candidate, a location candidate α3 represented by individual information 152-3 in which a value of Eval(α) is maximum.

The selection unit 14 stores, in the storage unit 15, a location candidate selection result 156 representing a selected location candidate. A user can confirm, via the management terminal device 20, the location candidate selection result 156 stored in the storage unit 15.

Next, with reference to flowcharts of FIGS. 11A and 11B, an operation (processing) of the location change managing device 10 according to the present example embodiment is described in detail.

The estimation unit 12 estimates, based on individual information 152-0 representing current locations of APs and communication environment information 153, communication quality of a current work site (step S101). When communication quality of the current work site satisfies criteria (Yes in step S102), entire processing is finished. When communication quality of the current work site does not satisfy criteria (No in step S102), the location change managing device 10 sets "1" for a variable "i" (step S103).

The generation unit 11 generates, based on the individual information 152-0 and genetic algorithm information 151, one or more pieces of individual information 152-$i$ representing location candidates of APs (step S104). The estimation unit 12 estimates, based on one or more pieces of generated individual information 152-$i$ and the communication environment information 153, communication quality pertaining to a location candidate of APs represented by the individual information 152-$i$ (step S105).

The calculation unit 13 determines a difference between the individual information 152-$i$ and the individual information 152-0 and calculates, based on the determined difference, a location cost pertaining to a location candidate of APs represented by the individual information 152-$i$ (step S106). The selection unit 14 calculates, with respect to each location candidate of APs represented by individual information 152-$i$, a location change evaluation value Eval in which the estimated communication quality and the calculated location change cost are weighted summed (step S107).

The selection unit 14 compares, with respect to a location change evaluation value Eval, a maximum value of Eval pertaining to last-time generated (preceding-generation) individual information 152-($i$-1) and a maximum value of Eval pertaining to this-time generated (current-generation) individual information 152-$i$ (step S108). When a change amount of a maximum value of Eval is equal to or more than a threshold (Yes in step S109), the location change managing device 10 sets "i+1" for a variable "i" (step S110). The generation unit 11 is controlled by the selection unit 14 and generates, based on the individual information 152-($i$-1) and the genetic algorithm information 151, one or more pieces of new (next-generation) individual information 152-$i$ (step S111), and processing returns to step S105.

When a change amount of a maximum value of Eval is not equal to or more than a threshold (No in step S109), the selection unit 14 specifies individual information 152 in which a location change evaluation value Eval is maximum from among pieces of individual information 152 generated so far and stores, in the storage unit 15, a location candidate selection result 156 representing the specified individual information 152 (step S112), and entire processing is finished.

The location change managing device 10 according to the present example embodiment can reliably and efficiently construct a wireless communication environment with stable quality, even in a location where an environment change pertaining to wireless communication is severe. The reason is that the location change managing device 10 estimates communication quality when locations of wireless communication apparatuses are changed from a current location to another location different from the current location, calculates a location change cost required for a location change to a location candidate, and selects, based on communication quality and the location change cost pertaining to the location candidate, a specific location candidate that satisfies criteria. However, in the estimation, locations before a change is not limited to current locations and may be locations at any time.

Hereinafter, advantageous effects achieved by the location change managing device 10 according to the present example embodiment are described in detail.

In a construction site, a factory, or the like, a physical environment changes and due to the change, an environment pertaining to wireless communication severely changes, and therefore in such locations, a stable-quality wireless communication environment is expected to be more reliably and efficiently constructed. In such locations, it is necessary to maintain communication quality at a predetermined level or higher by changing, according to a change of a physical environment, locations of wireless communication apparatuses installed in the locations. At that time, a challenge is to manage a location change in view of both of a degree of improvement in communication quality by the location change and a cost required for the location change.

For such a challenge, the location change managing device 10 according to the present example embodiment includes the generation unit 11, the estimation unit 12, the calculation unit 13, and the selection unit 14 and operates as described above with reference to FIGS. 1 to 11. In other words, the generation unit 11 generates, when a communication environment of access points (wireless communication apparatuses) changes from a first state to a second state, one or more location candidates for APs in the second state in such a way as to be different from locations of the APs in the first state. The estimation unit 12 estimates communication quality pertaining to a location candidate for APs in a second state. The calculation unit 13 calculates, with respect to a location candidate, a location change cost required for changing locations of APs from locations in a first state to the location candidate. The selection unit 14 selects, based on communication quality and a location change cost pertaining to a location candidate, a specific location candidate that satisfies criteria from among location candidates.

In other words, the location change managing device 10 according to the present example embodiment manages a location change in view of both of a degree of improvement in communication quality by a location change of wireless communication apparatuses and a cost required for the location change, and therefore can reliably and efficiently construct a wireless communication environment with stable quality, even in locations where an environment change pertaining to wireless communication is severe.

The calculation unit 13 according to the present example embodiment calculates, with respect to APs, a location change cost including at least one of a new-installation cost, a removal cost, or a relocation cost. The calculation unit 13 further calculates a movement path required when work for changing locations of the APs from locations (current locations) in a first state to a location candidate is performed. Thereby, the calculation unit 13 can calculate a location change cost with high accuracy. Therefore, the location change managing device 10 according to the present example embodiment can more efficiently construct a wireless communication environment with stable quality, even in locations where an environment change pertaining to wireless communication is severe.

The generation unit 11 according to the present example embodiment generates, by using a genetic algorithm, a location candidate for APs over one or more generations. For example, calculation for determining, based on communication environment information 153, a location candidate for APs in which communication quality of a work site satisfies criteria is complex. In contrast, calculation for determining a location candidate for APs using a genetic algorithm is simple. Information generated by using a genetic algorithm inherits preceding-generation information, and therefore a location candidate generated based on locations in a first state is similar to current locations. This is a factor for reducing a location change cost from current locations to a location candidate. Therefore, the location change managing device 10 according to the present example embodiment can more efficiently construct a wireless communication environment with stable quality, even in a location where an environment change pertaining to wireless communication is severe.

The selection unit 14 according to the present example embodiment calculates, for each location candidate, a location change evaluation value Eval($\alpha$) and calculates a change amount in which a maximum value of Eval($\alpha$) pertaining to a this-time generated (current-generation) location candidate and a maximum value of Eval($\alpha$) pertaining to a last-time generated (preceding-generation) location candidate are compared. The selection unit 14 specifies, when the change amount is less than a threshold, a location candidate in which Eval($\alpha$) is maximum from among location candidates generated so far and controls, when the change amount is equal to or more than a threshold, the generation unit 11 in such a way as to generate a next-generation location candidate. In other words, the location change managing device 10 according to the present example embodiment stops, in a process for generating a location candidate by using a genetic algorithm, newly generating a location candidate when a change of a location change evaluation value is regarded to converge. Thereby, the location change managing device 10 according to the present example embodiment avoids continuing newly generating a location candidate over a long time and therefore can more efficiently construct a wireless communication environment with stable quality.

An algorithm used for generating a location candidate by the generation unit 11 is not limited to a genetic algorithm. The generation unit 11 may use heuristics (a method of acquiring an approximate or provisional solution by using a deduction, an empirical rule, or the like capable of empirically deriving a correct solution to some extent) different from a genetic algorithm.

The selection unit 14 according to the present example embodiment executes predetermined weighting for communication quality and a location change cost and calculates a weighted sum of the communication quality and the location change cost. Therefore, the location change managing device 10 according to the present example embodiment can flexibly manage a location change of APs in accordance with a construction policy (e.g. on which one of quality and a cost great importance is placed) for a wireless communication environment in a work site.

The estimation unit 12, the calculation unit 13, and the selection unit 14 according to the present example embodiment may not execute the above-described processing for all location candidates generated by the generation unit 11 and may be configured in such a way as not to execute the above-described processing for some location candidates. In other words, the location change managing device 10 may exclude, from processing targets, location candidates for which the above-described processing does not need to be executed and in which it is clear that values of Eval($\alpha$) are not maximum, from among location candidates generated by the generation unit 11.

A target for which the location change managing device 10 manages a location change is not limited to an access point. The location change managing device 10 may regard a plurality of wireless communication apparatuses, for example, being installed in a work site and including a function for mutually performing ad-hoc communication as a target for which a location change is managed.

<Modified Example of First Example Embodiment>

Next, with regard to a modified example in which a function is further added to the location change managing device 10 according to the above-described first example embodiment, the added function is described. A configuration of a location change managing device 10 according to the present modified example is as described in FIG. 1. The location change managing device 10 according to the above-described first example embodiment achieves determining, when current communication quality is in a decreased state due to a change of a communication environment in a work site, an optimum location candidate of APs in which a current location of the AP is changed, in view of both of communication quality and a location change cost. In addition, the location change managing device 10 according to the present modified example achieves determining, in such a way as to be able to cope with a change of a communication environment generated by work performed in a future, based on a work plan in a work site, an optimum combination of a location candidate (initial location candidate) of APs before performing the work (when a communication environment is in a first state) and a location candidate of APs after performing the work (when a communication environment is in a second state), in view of both of communication quality and a location change cost.

First, a generation unit 11 according to the present modified example, for example, randomly generates an initial value of an initial location candidate $\alpha^-$ of APs before performing work in a work site and an initial value of a location candidate $\alpha^+$ of the AP after performing the work. However, it is preferable that an initial value of an initial location candidate $\alpha^-$ and an initial value of a location candidate $\alpha^+$ are, for example, equal to each other in view of a location change cost required for a location change from the initial location candidate $\alpha^-$ to the location candidate $\alpha^+$. The generation unit 11 generates, based on the initial value of the initial location candidate $\alpha^-$, the initial value of the location candidate $\alpha^+$, and genetic algorithm information 151, an initial location candidate $\alpha^-$ and a location candidate $\alpha^+$ over one or more generations, similarly to the above-described first example embodiment. The generation unit 11 stores, in a storage unit 15, individual information 152 representing the initial location candidate $\alpha^-$ and the location candidate $\alpha^+$ generated over one or more generations.

An estimation unit 12 according to the present modified example estimates, based on a generated initial location candidate $\alpha^-$ and communication environment information 153 representing a physical environment before the work, communication quality with respect to each initial location candidate $\alpha^-$, similarly to the above-described first example embodiment and stores communication quality information 154 representing an estimation result in the storage unit 15. The estimation unit 12 further estimates, based on a generated initial location candidate $\alpha^+$ and the communication environment information 153 representing a physical environment after the work, communication quality with respect to each initial location candidate $\alpha^+$, similarly to the above-described first example embodiment and stores communication quality information 154 representing the estimation result in the storage unit 15. However, it is assumed that the communication environment information 153 according to the present modified example includes information representing physical environments before and after the work performed in a future, based on a work plan in a work site.

A calculation unit 13 according to the present modified example calculates, with respect to each combination of an initial location candidate $\alpha^-$ and a location candidate $\alpha^+$, a location change cost required for changing a location of an AP from the initial location candidate $\alpha^-$ represented by individual information 152 to the location candidate $\alpha^+$ represented by the individual information 152, similarly to the above-described first example embodiment. The calculation unit 13 stores, in the storage unit 15, location change cost information 155 representing the calculated location change cost.

A selection unit 14 according to the present modified example selects, based on communication quality information 154 and location change cost information 155, a specific combination $\alpha$ that satisfies criteria from among combinations of an initial location candidate $\alpha^-$ and a location candidate $\alpha^+$. The selection unit 14 according to the present modified example may employ, as the criteria, for example, criteria that a location change evaluation value Eval($\alpha$) indicated by Expression 2 is maximum.

$$\text{Eval}(\alpha) = \text{Cover}(\alpha^-) + \text{Cover}(\alpha^+) - K_2 \times \text{Reloc}(\alpha^-, \alpha^+) \quad \text{(Expression 2)}$$

Note that in Expression 2, Cover($\alpha^-$) and Cover($\alpha^+$) represent communication quality of an initial location candidate $\alpha^-$ and a location candidate $\alpha^+$ in this order, and Reloc($\alpha^-, \alpha^+$) represents a location change cost from an initial location candidate $\alpha^-$ to a location candidate $\alpha^+$. In Expression 2, "$K_2$" is a parameter for adjusting weighting between communication quality and a location change cost in calculation of a location change evaluation value Eval($\alpha$), and is assumed to be provided, for example, by a user.

The selection unit 14 selects a specific combination $\alpha$ of an initial location candidate $\alpha^-$ and a location candidate $\alpha^+$ by using Expression 2, similarly to selection of a specific location candidate $\alpha$ by using Expression 1 according to the above-described first example embodiment. The selection unit 14 stores, in the storage unit 15, a location candidate selection result 156 representing the selected specific combination $\alpha$ of an initial location candidate $\alpha^-$ and a location candidate $\alpha^+$.

The location change managing device 10 according to the present modified example can determine, when a communication environment of a work site has three or more states according to a plurality of pieces of work performed in a future, an optimum combination pertaining to location candidates of APs according to each communication environments in view of both of communication quality and a location change cost.

When a communication environment of a work site has n (wherein n is any integer equal to or more than 3) states, the generation unit 11 according to the present modified example regards a communication environment of a second state as a communication environment of a new first state and repeatedly executes newly generating, based on genetic algorithm information 151, a location candidate similarly to the above-described operation. Thereby, the generation unit 11 generates a combination of location candidates of APs in n states of communication environments.

The estimation unit 12 according to the present modified example regards a communication environment in a second state as a communication environment in a new first state and repeatedly executes estimating, based on communication environment information 153, communication quality with respect to each location candidate similarly to the above-described operation.

The calculation unit 13 according to the present modified example regards a communication environment in a second state as a communication environment in a new first state and repeatedly executes calculating, similarly to the above-described operation, a location change cost from a location candidate according to a communication environment in a certain state to a location candidate according to a communication environment in a subsequent state.

The selection unit 14 according to the present modified example selects a combination $\alpha$ of location candidates in which, for example, a location change evaluation value Eval($\alpha$) indicated by Expression 3 is maximum.

$$\text{Eval}(\alpha) = \sum_{i=1}^{n} \text{Cover}(\alpha_i) - \sum_{i=1}^{n-1} K_2 \times \text{Reloc}(\alpha_i, \alpha_{i+1}) 5 \quad \text{(Expression 3)}$$

Note that in Expression 3, "$\alpha_1$" represents a location candidate of APs in a communication environment in an i-th state (i is any integer from among 1 to n).

The location change managing device 10 according to the present modified example can reliably and efficiently construct a wireless communication environment with stable quality, even in a location where an environment change pertaining to wireless communication is severe. The reason is as described according to the first example embodiment.

The generation unit 11 according to the present modified example generates one or more initial location candidates of access points (wireless communication apparatuses) in a case where a communication environment is in a first state. The estimation unit 12 according to the present modified example estimates communication quality pertaining to an initial location candidate of APs in a first state. The calculation unit 13 according to the present modified example calculates, with respect to a combination of an initial location candidate and a location candidate, a location change cost generated in changing locations of APs from an initial location candidate to a location candidate. The selection unit 14 according to the present modified example selects, based on communication quality and a location change cost pertaining to a combination of an initial location candidate and a location candidate, a specific combination of a specific initial location candidate and a specific location candidate, the specific combination satisfying criteria, from among initial location candidates and location candidates. Thereby, the location change managing device 10 according to the present modified example can reliably and efficiently plan to construct a wireless communication environment in such a way as to be able to cope with a change of a communication environment generated by certain work performed in a future in a work site.

The generation unit 11, the estimation unit 12, and the calculation unit 13 according to the present modified example regard, when a communication environment may have three or more states, a communication environment in a second state as a communication environment in a new first state and repeatedly execute the above-described operation. The selection unit 14 according to the present modified example selects, based on communication quality and a location change cost pertaining to a combination of an initial location candidate and a plurality of location candidates, a combination of a specific initial location candidate and a plurality of specific location candidates, the combination satisfying criteria, from among initial location candidates and a plurality of location candidates. Thereby, the location change managing device 10 according to the present modified example can reliably and efficiently plan to construct a wireless communication environment in such a way as to be able to cope with a plurality times of changes of a communication environment generated by work performed based on a work plan in a work site.

Second Example Embodiment

Figure 12:
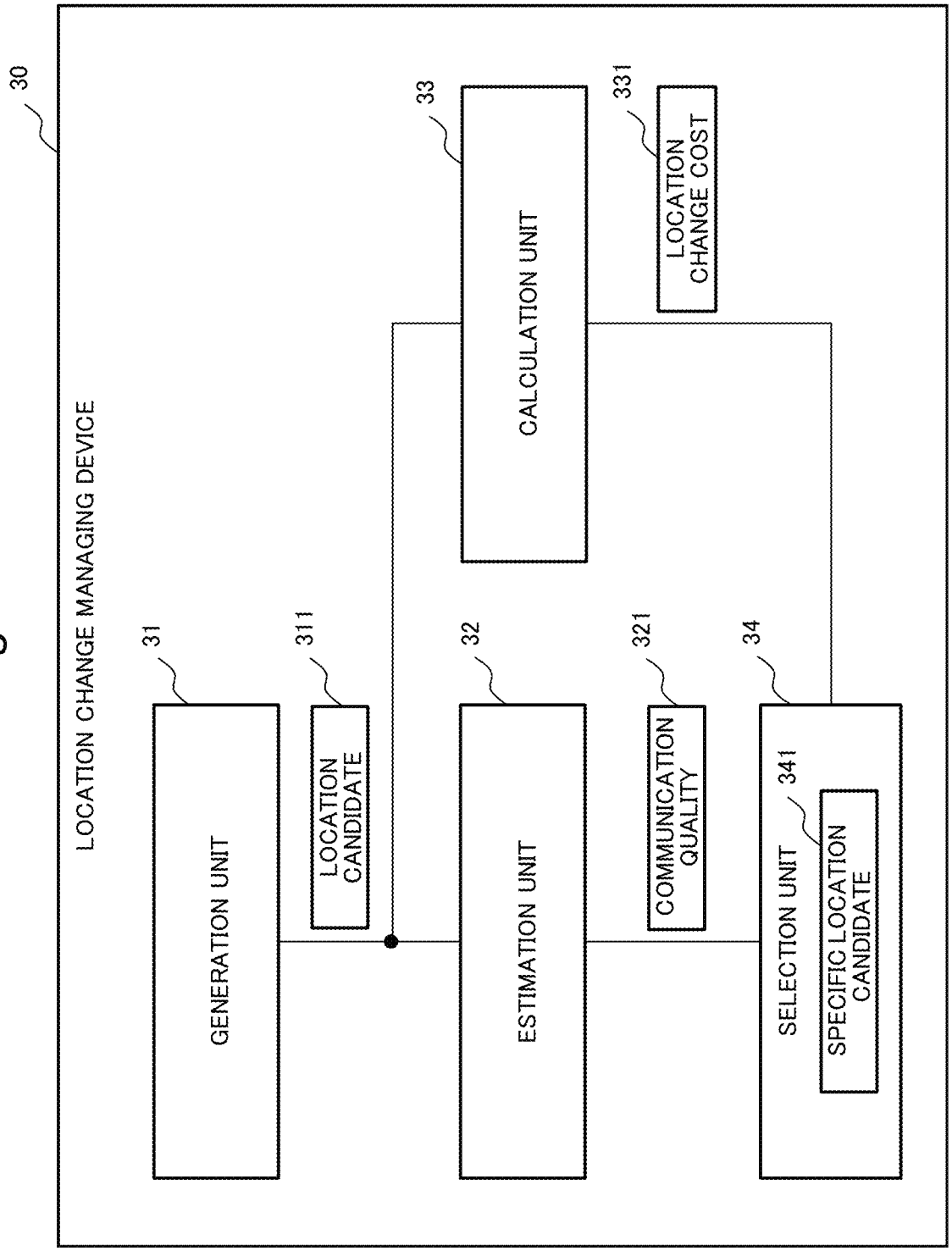
FIG. 12 is a block diagram illustrating a configuration of a location change managing device 30 according to a second example embodiment of the present invention.

FIG. 12 is a block diagram illustrating a configuration of a location change managing device 30 according to a second example embodiment of the present invention.

The location change managing device 30 according to the present example embodiment includes a generation unit 31, an estimation unit 32, a calculation unit 33, and a selection unit 34.

The generation unit 31 generates, when communication environment of wireless communication apparatuses changes from a first state to a second state, one or more location candidates 311 of the wireless communication apparatuses in the second state in such a way as to be different from locations of the wireless communication apparatuses in the first state.

The estimation unit 32 estimates communication quality 321 pertaining to a location candidate 311 of wireless communication apparatuses in a second state.

The calculation unit 33 calculates, with respect to a location candidate 311, a location change cost 331 required for changing locations of wireless communication apparatuses from locations in a first state to the location candidate 311.

The selection unit 34 selects, based on communication quality 321 and a location change cost 331 pertaining to a location candidate 311, a specific location candidate 341 that satisfies criteria from among location candidates 311.

The location change managing device 30 according to the present example embodiment can reliably and efficiently construct a wireless communication environment with stable quality, even in a location where an environment change pertaining to wireless communication is severe. The reason is that the location change managing device 30 estimates communication quality 321 in a case where locations of wireless communication apparatuses is changed to a location candidate 311, calculates a location cost 331 required for a location change to the location candidate 311, and selects, based on the communication quality 321 and the location change cost 331 pertaining to the location candidate 311, a specific location candidate 341 that satisfies criteria.

<Hardware Configuration Example>

Each unit in a location change managing device illustrated in FIGS. 1 and 12 according to the above-described example embodiments can be achieved by dedicated hardware (HW) (electronic circuit). In FIGS. 1 and 12, at least the following components are conceivable as a function (processing) unit (software module) of a software program.

The generation units 11 and 31,
The estimation units 12 and 32,
The calculation units 13 and 33,
The selection units 14 and 34, and
A storage control function of the storage unit 15.

Division of these units illustrated in the drawings is a configuration for convenience of description, and various configurations are assumable when implemented. One example of a hardware environment in this case is described with reference to FIG. 13.

Figure 13:
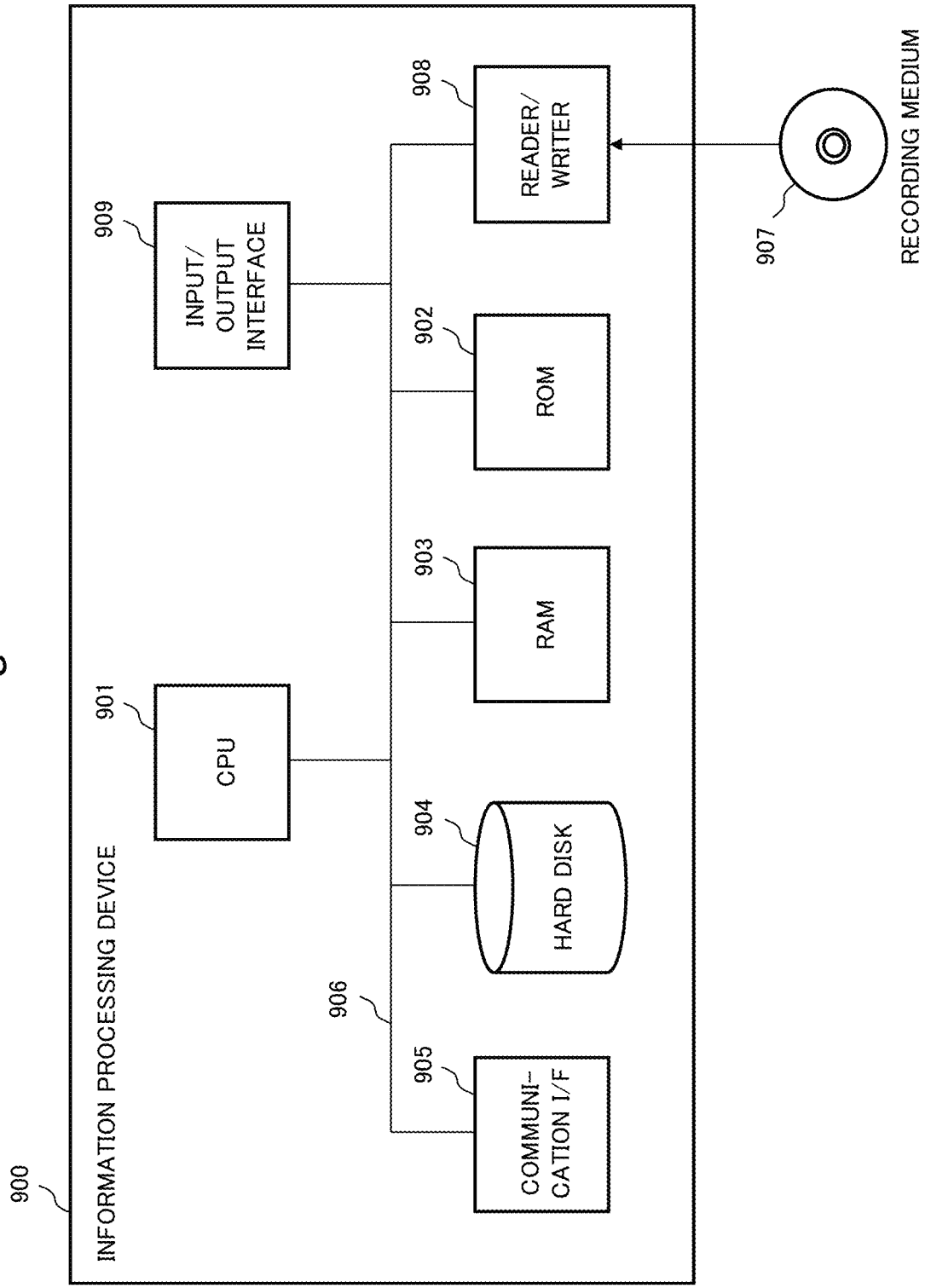
FIG. 13 is a block diagram illustrating a configuration of an information processing device 900 capable of running the location change managing devices according to the example embodiments of the present invention.

FIG. 13 is a diagram exemplarily illustrating a configuration of an information processing device 900 (computer) capable of running a location change managing device according to the example embodiments of the present invention. In other words, FIG. 13 represents a configuration of a computer (information processing device) capable of achieving a location change managing device illustrated in FIGS. 1 and 12 and represents a hardware environment capable of achieving functions according to the above-described example embodiments.

The information processing device 900 illustrated in FIG. 13 includes the following as components.

A central processing unit (CPU) 901,
A read only memory (ROM) 902,
A random access memory (RAM) 903,
A hard disk (storage device) 904,
A communication interface 905,
A bus 906 (communication line),
A reader/writer 908 capable of executing reading/writing for data stored on a recording medium 907 such as a compact disc read-only memory (CD-ROM) and the like, and
An input/output interface 909 such as a monitor, a speaker, a keyboard, and the like.

In other words, the information processing device 900 including the components is a general computer in which these components are connected via the bus 906. The information processing device 900 may include a plurality of CPUs 901 or may include a CPU 901 configured by multicore.

The present invention described by using the above-described example embodiment as examples supplies, to the information processing device 900 illustrated in FIG. 13, a computer program capable of achieving the following function. The function is a function of the above-described configuration in a block configuration diagram (FIGS. 11 and 12) referred to in description of the example embodiments or a flowchart (FIGS. 11A and 11B). The present invention is achieved thereafter by reading the computer program onto the CPU 901 of the hardware, and interpreting and executing the program. A computer program supplied into the device may be stored on a readable/writable, volatile memory (RAM 903) or a non-volatile storage device such as the ROM 902, the hard disk 904, and the like.

In the above-described case, a currently common procedure can be employed as a supply method of a computer program into the hardware. The procedure includes, for example, a method of installation into the device via various types of recording media 907 such as a CD-ROM and the like and a method of download from an outside via a communication line such as the Internet and the like. In such a case, it is conceivable that the present invention includes a code configuring the computer program or a recording medium 907 storing the code.

While the invention has been particularly shown and described with reference to exemplary embodiments thereof, the invention is not limited to these embodiments. It will be understood by those of ordinary skill in the art that various changes in form and details may be made therein without 20 departing from the spirit and scope of the present invention as defined by the claims.

A part or the whole of the above-described example embodiments can be described as the following supplementary notes. However, the present invention exemplarily described according to the above-described example embodiments is not limited to the following.

(Supplementary Note 1)

A location change managing device including:

generation means that generates, when a communication environment of wireless communication apparatuses changes from a first state to a second state, one or more location candidates for the wireless communication apparatuses in the second state in such a way as to be different from locations of the wireless communication apparatuses in the first state;

estimation means that estimates communication quality pertaining to the location candidates for the wireless communication apparatuses in the second state;

calculation means that calculates, with respect to the location candidates, a location change cost required for changing locations of the wireless communication apparatuses from the locations in the first state to the location candidate; and selection means that selects, based on the communication quality and the location change cost pertaining to the location candidates, a specific location candidate that satisfies criteria from among the location candidates.

(Supplementary Note 2)

The location change managing device according to supplementary note 1, wherein the generation means generates one or more initial location candidates for the wireless communication apparatuses in the first state, the estimation means estimates the communication quality pertaining to the initial location candidates for the wireless communication apparatuses in the first state, the calculation means calculates, with respect to a combination of the initial location candidate and the location candidate, the location change cost generated in changing locations of the wireless communication apparatuses from the initial location candidate to the location candidate, and the selection means selects, based on the communication quality and the location change cost pertaining to a combination of the initial location candidate and the location candidate, a combination of a specific initial location candidate and a specific location candidate, the combination satisfying criteria, from among the initial location candidates and the location candidates.

(Supplementary Note 3)

The location change managing device according to supplementary note 2, wherein the generation means regards, when the communication environment may have three or more states, the second state as a new one of the first state and repeatedly executes newly generating the location candidate, the estimation means regards the second state as a new one of the first state and repeatedly executes newly estimating the communication quality, the calculation means regards the second state as a new one of the first state and repeatedly executes newly calculating the location change cost, and the selection means selects, based on the communication quality and the location change cost pertaining to a combination of the initial location candidate and a plurality of the location candidates, a combination of a specific initial location candidate and a plurality of specific location candidates, the combination satisfying criteria, from among the initial location candidates and a plurality of the location candidates.

(Supplementary Note 4)

The location change managing device according to any one of supplementary notes 1 to 3, wherein the calculation means calculates the location change cost including at least one of a new installation cost, a removal cost, and a relocation cost pertaining to the wireless communication apparatuses.

(Supplementary Note 5)

The location change managing device according to any one of supplementary notes 1 to 4, wherein the calculation means calculates a movement path required when work for changing locations of the wireless communication apparatuses from locations in the first state to the location candidate is performed.

(Supplementary Note 6)

The location change managing device according to any one of supplementary notes 1 to 5, wherein the estimation means estimates, with respect to a region where communication of the wireless communication apparatuses is required, a ratio of a region where the communication quality satisfies criteria.

(Supplementary Note 7)

The location change managing device according to any one of supplementary notes 1 to 6, wherein the estimation means performs, based on communication environment information representing a physical environment, simulation pertaining to radio-wave propagation by using a ray tracing method.

(Supplementary Note 8)

The location change managing device according to any one of supplementary notes 1 to 7, wherein the generation means generates, by using heuristics, the location candidates for the wireless communication apparatuses in the second state over one or more generations.

(Supplementary Note 9)

The location change managing device according to supplementary note 8, wherein the selection means
calculates, with respect to the location candidate, a location change evaluation value based on the communication quality and the location change cost, calculates a change amount in which a maximum value of the location change evaluation value pertaining to a current-generation of the location candidate and a maximum value of the location change evaluation value pertaining to a preceding-generation of the location candidate are compared,
specifies, when the change amount is less than a threshold, the location candidate in which the location change evaluation value is maximum from among the location candidates generated so far, and
controls, when the change amount is equal to or more than the threshold, the generation means in such a way as to generate a next-generation of the location candidate.

(Supplementary Note 10)

The location change managing device according to supplementary note 8 or 9, wherein
the generation means uses a genetic algorithm as the heuristics.

(Supplementary Note 11)

The location change managing device according to any one of supplementary notes 1 to 10, wherein
the selection means executes predetermined weighting for the communication quality and the location change cost, and then calculates a weighted sum of the communication quality and the location change cost.

(Supplementary Note 12)

A location change managing method including, by an information processing device:
generating, when a communication environment of wireless communication apparatuses changes from a first state to a second state, one or more location candidates for the wireless communication apparatuses in the second state in such a way as to be different from locations of the wireless communication apparatuses in the first state;
estimating communication quality pertaining to the location candidates for the wireless communication apparatuses in the second state;
calculating, with respect to the location candidates, a location change cost required for changing locations of the wireless communication apparatuses from the locations in the first state to the location candidate; and
selecting, based on the communication quality and the location change cost pertaining to the location candidates, a specific location candidate that satisfies criteria from among the location candidates.

(Supplementary Note 13)

A location change managing program for causing a computer to execute:
generation processing of generating, when a communication environment of wireless communication apparatuses changes from a first state to a second state, one or more location candidates for the wireless communication apparatuses in the second state in such a way as to be different from locations of the wireless communication apparatuses in the first state;
estimation processing of estimating communication quality pertaining to the location candidates for the wireless communication apparatuses in the second state;
calculation processing of calculating, with respect to the location candidates, a location change cost required for changing locations of the wireless communication apparatuses from the locations in the first state to the location candidate; and
selection processing of selecting, based on the communication quality and the location change cost pertaining to the location candidates, a specific location candidate that satisfies criteria from among the location candidates.

This application is based upon and claims the benefit of priority from Japanese patent application No. 2018-122214, filed on Jun. 27, 2018, the disclosure of which is incorporated herein in its entirety by reference.

REFERENCE SIGNS LIST

10 Location change managing device
11 Generation unit
12 Estimation unit
13 Calculation unit
14 Selection unit
15 Storage unit
151 Genetic algorithm information
152 Individual information
153 Communication environment information
154 Communication quality information
155 Location change cost information
156 Location candidate selection result
20 Management terminal device
30 Location change managing device
31 Generation unit
311 Location candidate
32 Estimation unit
321 Communication quality
33 Calculation unit
331 Location change cost
34 Selection unit
341 Specific location candidate
900 Information processing device
901 CPU
902 ROM
903 RAM
904 Hard disk (storage device)
905 Communication interface
906 Bus
907 Recording medium
908 Reader/writer
909 Input/output interface

What is claimed is:

1. A location change managing device comprising:
a generation unit configured to generate, when a communication environment of wireless communication apparatuses changes from a first state to a second state, one or more location candidates for the wireless communication apparatuses in the second state in such a way as to be different from locations of the wireless communication apparatuses in the first state;
an estimation unit configured to estimate communication quality pertaining to the location candidates for the wireless communication apparatuses in the second state;
a calculation unit configured to calculate, with respect to the location candidates, a location change cost required for changing locations of the wireless communication apparatuses from the locations in the first state to the location candidate; and
a selection unit configured to select, based on the communication quality and the location change cost pertaining to the location candidates, a specific location candidate that satisfies criteria from among the location candidates.

2. The location change managing device according to claim 1, wherein
the generation unit generates one or more initial location candidates for the wireless communication apparatuses in the first state,
the estimation unit estimates the communication quality pertaining to the initial location candidates for the wireless communication apparatuses in the first state,
the calculation unit calculates, with respect to a combination of the initial location candidate and the location candidate, the location change cost generated in changing locations of the wireless communication apparatuses from the initial location candidate to the location candidate, and
the selection unit selects, based on the communication quality and the location change cost pertaining to a combination of the initial location candidate and the location candidate, a combination of a specific initial location candidate and a specific location candidate, the combination satisfying criteria, from among the initial location candidates and the location candidates.

3. The location change managing device according to claim 2, wherein
the generation unit regards, when the communication environment may have three or more states, the second state as a new one of the first state and repeatedly executes newly generating the location candidate,
the estimation unit regards the second state as a new one of the first state and repeatedly executes newly estimating the communication quality,
the calculation unit regards the second state as a new one of the first state and repeatedly executes newly calculating the location change cost, and
the selection unit selects, based on the communication quality and the location change cost pertaining to a combination of the initial location candidate and a plurality of the location candidates, a combination of a specific initial location candidate and a plurality of specific location candidates, the combination satisfying criteria, from among the initial location candidates and a plurality of the location candidates.

4. The location change managing device according to claim 3, wherein
the calculation unit calculates the location change cost including at least one of a new installation cost, a removal cost, and a relocation cost pertaining to the wireless communication apparatuses.

5. The location change managing device according to claim 3, wherein
the calculation unit calculates a movement path required when work for changing locations of the wireless communication apparatuses from locations in the first state to the location candidate is performed.

6. The location change managing device according to claim 3, wherein
the estimation unit estimates, with respect to a region where communication of the wireless communication apparatuses is required, a ratio of a region where the communication quality satisfies criteria.

7. The location change managing device according to claim 2, wherein
the calculation unit calculates the location change cost including at least one of a new installation cost, a removal cost, and a relocation cost pertaining to the wireless communication apparatuses.

8. The location change managing device according to claim 2, wherein
the calculation unit calculates a movement path required when work for changing locations of the wireless communication apparatuses from locations in the first state to the location candidate is performed.

9. The location change managing device according to claim 2, wherein
the estimation unit estimates, with respect to a region where communication of the wireless communication apparatuses is required, a ratio of a region where the communication quality satisfies criteria.

10. The location change managing device according to claim 1, wherein
the calculation unit calculates the location change cost including at least one of a new installation cost, a removal cost, and a relocation cost pertaining to the wireless communication apparatuses.

11. The location change managing device according to claim 10, wherein
the calculation unit calculates a movement path required when work for changing locations of the wireless communication apparatuses from locations in the first state to the location candidate is performed.

12. The location change managing device according to claim 1, wherein
the calculation unit calculates a movement path required when work for changing locations of the wireless communication apparatuses from locations in the first state to the location candidate is performed.

13. The location change managing device according to claim 1, wherein
the estimation unit estimates, with respect to a region where communication of the wireless communication apparatuses is required, a ratio of a region where the communication quality satisfies criteria.

14. The location change managing device according to claim 1, wherein
the estimation unit performs, based on communication environment information representing a physical environment, simulation pertaining to radio-wave propagation by using a ray tracing method.

15. The location change managing device according to claim 1, wherein
the generation unit generates, by using heuristics, the location candidates for the wireless communication apparatuses in the second state over one or more generations.

16. The location change managing device according to claim 15, wherein
the selection unit
calculates, with respect to the location candidate, a location change evaluation value based on the communication quality and the location change cost,
calculates a change amount in which a maximum value of the location change evaluation value pertaining to a current-generation of the location candidate and a maximum value of the location change evaluation value pertaining to a preceding-generation of the location candidate are compared,
specifies, when the change amount is less than a threshold, the location candidate in which the location change evaluation value is maximum from among the location candidates generated so far, and
controls, when the change amount is equal to or more than the threshold, the generation unit in such a way as to generate a next-generation of the location candidate.

17. The location change managing device according to claim 15, wherein
the generation unit uses a genetic algorithm as the heuristics.

18. The location change managing device according to claim 1, wherein
the selection unit executes predetermined weighting for the communication quality and the location change cost, and then calculates a weighted sum of the communication quality and the location change cost.

19. A location change managing method comprising, by an information processing device:
generating, when a communication environment of wireless communication apparatuses changes from a first state to a second state, one or more location candidates for the wireless communication apparatuses in the second state in such a way as to be different from locations of the wireless communication apparatuses in the first state;
estimating communication quality pertaining to the location candidates for the wireless communication apparatuses in the second state;
calculating, with respect to the location candidates, a location change cost required for changing locations of the wireless communication apparatuses from the locations in the first state to the location candidate; and
selecting, based on the communication quality and the location change cost pertaining to the location candidates, a specific location candidate that satisfies criteria from among the location candidates.

20. A non-transitory recording medium storing a location change managing program for causing a computer to execute:
generation processing of generating, when a communication environment of wireless communication apparatuses changes from a first state to a second state, one or more location candidates for the wireless communication apparatuses in the second state in such a way as to be different from locations of the wireless communication apparatuses in the first state;
estimation processing of estimating communication quality pertaining to the location candidates for the wireless communication apparatuses in the second state;
calculation processing of calculating, with respect to the location candidates, a location change cost required for changing locations of the wireless communication apparatuses from the locations in the first state to the location candidate; and
selection processing of selecting, based on the communication quality and the location change cost pertaining to the location candidates, a specific location candidate that satisfies criteria from among the location candidates.

* * * * *